US010221622B2

(12) United States Patent
Campagna

(10) Patent No.: US 10,221,622 B2
(45) Date of Patent: *Mar. 5, 2019

(54) ROLLER SHADE WITH A PRETENSIONED SPRING AND METHOD FOR PRETENSIONING THE SPRING

(71) Applicant: Crestron Electronics, Inc., Rockleigh, NJ (US)

(72) Inventor: Michael Campagna, Woodcliff Lake, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 196 days.

This patent is subject to a terminal disclaimer.

(21) Appl. No.: 15/395,585

(22) Filed: Dec. 30, 2016

(65) Prior Publication Data

US 2017/0107760 A1 Apr. 20, 2017

Related U.S. Application Data

(63) Continuation of application No. 14/847,506, filed on Sep. 8, 2015, now Pat. No. 9,631,425.

(51) Int. Cl.
*E06B 9/56* (2006.01)
*E06B 9/60* (2006.01)
(Continued)

(52) U.S. Cl.
CPC .......... *E06B 9/60* (2013.01); *E06B 9/44* (2013.01); *E06B 9/72* (2013.01); *F16C 11/04* (2013.01)

(58) Field of Classification Search
CPC ..... E06B 9/72; E06B 9/62; E06B 9/60; E06B 9/44
(Continued)

(56) References Cited

U.S. PATENT DOCUMENTS 1,090,931 A 3/1914 McLean
1,688,563 A 10/1928 Tomlinson
(Continued)

FOREIGN PATENT DOCUMENTS

DE 102004035117 A1 2/2006
EP 0911479 A2 * 4/1999 ............... E06B 9/08
(Continued)

*Primary Examiner* — Katherine W Mitchell
*Assistant Examiner* — Johnnie A. Shablack
(74) *Attorney, Agent, or Firm* — Crestron Electronics, Inc.

(57) ABSTRACT

A roller shade having a counterbalancing assembly with an optimally pretensioned spring that lowers the torque load on the motor of the roller shade throughout the rolling up or rolling down cycles. The roller shade comprises a roller tube, a gudgeon pin having a first stop, a gudgeon body having a through bore and rotatably connected about the gudgeon pin and operably connected to the roller tube, a limit nut operably connected to the gudgeon body and adapted to axially travel along the gudgeon pin within the through bore, a spring, a first spring carrier connected to the first end of the spring and operably connected to the gudgeon pin, and a second spring carrier connected to the second end of the spring and operably connected to the roller tube. The spring is pretensioned and the limit nut abuts the first stop thereby locking the pretension. Rotation of the roller tube to roll down the shade further tensions the spring, and rotation of the roller tube to roll up the shade releases the tension in the spring.

23 Claims, 12 Drawing Sheets

(51) Int. Cl.
  *E06B 9/44* (2006.01)
  *E06B 9/72* (2006.01)
  *F16C 11/04* (2006.01)

(58) Field of Classification Search
  USPC .......................... 160/313, 315, 318
  See application file for complete search history.

(56) References Cited

U.S. PATENT DOCUMENTS

| | | | |
|---|---|---|---|
| 1,726,589 A | 9/1929 | Schultes | |
| 1,882,592 A | 10/1932 | Hendrickson | |
| 1,885,400 A | 11/1932 | Ygger | |
| 1,920,099 A | 7/1933 | Moricca | |
| 2,491,074 A * | 12/1949 | Bell | E06B 9/44 |
| | | | 160/326 |
| 3,099,916 A | 8/1963 | Rosenbaum | |
| 3,115,927 A * | 12/1963 | Znamirowski | E06B 9/60 |
| | | | 160/301 |
| 3,763,916 A * | 10/1973 | Gossling | F03G 1/00 |
| | | | 160/318 |
| 3,853,170 A | 12/1974 | Barettella | |
| 3,965,960 A | 6/1976 | Massey | |
| 4,009,745 A | 3/1977 | Erpenbeck | |
| 4,228,843 A * | 10/1980 | Kobayashi | E06B 9/60 |
| | | | 160/306 |
| 4,373,569 A * | 2/1983 | Barettella | E06B 9/44 |
| | | | 160/263 |
| 4,399,857 A * | 8/1983 | Honma | E06B 9/50 |
| | | | 160/323.1 |
| 4,427,050 A * | 1/1984 | Toppen | E06B 9/60 |
| | | | 160/315 |
| 4,429,729 A | 2/1984 | Winslow | |
| 4,482,137 A | 11/1984 | Gavagan | |
| RE31,793 E | 1/1985 | Berman | |
| 4,523,620 A | 6/1985 | Mortellite | |
| 4,729,418 A * | 3/1988 | Rude | E06B 9/60 |
| | | | 160/323.1 |
| 5,078,198 A | 1/1992 | Tedeschi | |
| 5,152,032 A | 10/1992 | Davis et al. | |
| 5,271,446 A * | 12/1993 | Hwang | B60J 1/2033 |
| | | | 160/120 |
| 5,274,499 A | 12/1993 | Shopp | |
| 5,419,010 A | 5/1995 | Mullet | |
| 5,437,324 A | 8/1995 | Sternquist | |
| 5,460,216 A | 10/1995 | Hirao et al. | |
| 5,464,052 A | 11/1995 | Wieczorek | |
| 5,542,464 A | 8/1996 | Shiina | |
| 5,638,640 A | 6/1997 | Harbeck | |
| 5,934,354 A | 8/1999 | Price | |
| 5,964,426 A | 10/1999 | Tabellini | |
| 5,996,923 A | 12/1999 | Junquera | |
| 6,123,140 A | 9/2000 | Bergamaschi | |
| 6,134,835 A | 10/2000 | Krupke | |
| 6,155,328 A | 12/2000 | Welfonder | |
| 6,257,305 B1 | 7/2001 | Mullet et al. | |
| 6,263,942 B1 | 7/2001 | Miller | |
| 6,327,744 B1 | 12/2001 | Dorma | |
| 6,378,594 B1 * | 4/2002 | Yamanaka | E06B 9/80 |
| | | | 160/238 |
| 6,408,925 B1 | 6/2002 | Dorma | |
| 6,443,210 B1 * | 9/2002 | Welfonder | E06B 9/42 |
| | | | 160/296 |
| 6,467,714 B1 | 10/2002 | Rasmussen | |
| 6,615,897 B2 | 9/2003 | Dorma | |
| 6,655,736 B1 * | 12/2003 | Arenas | B60N 2/6063 |
| | | | 160/24 |
| 6,666,252 B2 * | 12/2003 | Welfonder | E06B 9/42 |
| | | | 160/296 |
| 6,854,503 B2 | 2/2005 | Cross | |
| 6,955,207 B2 | 10/2005 | Minder | |
| 7,128,124 B2 * | 10/2006 | Bibby | E06B 9/44 |
| | | | 160/263 |
| 7,147,030 B2 | 12/2006 | Dalle Nogare | |
| 7,234,503 B2 | 6/2007 | Kwak | |
| 7,237,592 B2 | 7/2007 | Arnoux | |
| 7,325,584 B2 | 2/2008 | Bousson | |
| 7,740,044 B2 | 6/2010 | Gutierrez | |
| 8,210,230 B2 * | 7/2012 | Glasl | B60J 1/2033 |
| | | | 160/313 |
| 8,258,993 B2 | 9/2012 | Inoue et al. | |
| 8,299,734 B2 | 10/2012 | Mullet et al. | |
| 8,368,328 B2 | 2/2013 | Mullet et al. | |
| 8,575,872 B2 | 11/2013 | Mullet et al. | |
| 8,659,246 B2 | 2/2014 | Mullet et al. | |
| 8,739,854 B2 | 6/2014 | Mullet et al. | |
| 8,776,861 B2 | 7/2014 | Bohlen et al. | |
| 8,791,658 B2 | 7/2014 | Mullet et al. | |
| 8,807,196 B2 | 8/2014 | Mullet et al. | |
| 8,904,683 B2 * | 12/2014 | Tornqvist | E06B 9/40 |
| | | | 40/498 |
| 8,919,419 B2 | 12/2014 | Mullet et al. | |
| 8,947,027 B2 | 2/2015 | Mullet et al. | |
| 8,973,644 B2 | 3/2015 | Munsters | |
| 9,016,348 B2 | 4/2015 | Campagna | |
| 9,027,625 B2 | 5/2015 | Persson | |
| 9,062,494 B2 | 6/2015 | Chen | |
| 9,080,381 B2 | 7/2015 | Haarer | |
| 9,152,032 B2 | 10/2015 | Mullet et al. | |
| 9,194,176 B2 | 11/2015 | Chen | |
| 9,194,179 B2 | 11/2015 | Mullet et al. | |
| 9,243,447 B2 | 1/2016 | MacDonald | |
| 9,249,623 B2 | 2/2016 | Mullet et al. | |
| 9,353,570 B2 | 5/2016 | Smith | |
| 9,376,862 B2 | 6/2016 | Mullet et al. | |
| 9,376,863 B2 | 6/2016 | Mullet et al. | |
| 9,394,743 B2 | 7/2016 | Mullet et al. | |
| 9,410,369 B2 | 8/2016 | Mullet et al. | |
| 9,593,530 B1 * | 3/2017 | Anthony | E06B 9/80 |
| 9,598,901 B2 | 3/2017 | Kirby et al. | |
| 9,611,690 B2 | 4/2017 | Mullet et al. | |
| 9,617,787 B2 * | 4/2017 | Bohlen | E06B 9/80 |
| 9,631,425 B2 | 4/2017 | Campagna | |
| 9,725,948 B2 | 8/2017 | Mullet et al. | |
| 9,725,952 B2 | 8/2017 | Mullet et al. | |
| 9,739,089 B2 * | 8/2017 | Smith | E06B 9/60 |
| 9,745,797 B2 | 8/2017 | Mullet et al. | |
| 9,771,755 B2 | 9/2017 | Mullet et al. | |
| 9,879,479 B2 * | 1/2018 | Haarer | E06B 9/42 |
| 10,030,439 B2 * | 7/2018 | Smith | E06B 9/38 |
| 10,030,442 B2 * | 7/2018 | Bohlen | E06B 9/62 |
| 2004/0226669 A1 | 11/2004 | Webb | |
| 2005/0087642 A1 | 4/2005 | Dalle Nogare | |
| 2007/0056698 A1 | 3/2007 | Lin | |
| 2008/0093038 A1 * | 4/2008 | Hansen | B60J 1/2063 |
| | | | 160/316 |
| 2008/0190572 A1 | 8/2008 | Kwak | |
| 2009/0127369 A1 | 5/2009 | Mullet et al. | |
| 2009/0301534 A1 * | 12/2009 | Bettega | E04F 10/0648 |
| | | | 135/96 |
| 2010/0200179 A1 | 8/2010 | Di Stefano | |
| 2010/0219306 A1 | 9/2010 | Detmer et al. | |
| 2010/0307701 A1 | 12/2010 | Peterson | |
| 2011/0005694 A1 | 1/2011 | Ng | |
| 2011/0024064 A1 | 2/2011 | Ng | |
| 2011/0315327 A1 | 12/2011 | Lin | |
| 2012/0067530 A1 * | 3/2012 | Barnes | E06B 9/50 |
| | | | 160/326 |
| 2013/0020038 A1 | 1/2013 | Barnes | |
| 2013/0153161 A1 * | 6/2013 | Haarer | E06B 9/42 |
| | | | 160/293.1 |
| 2013/0255890 A1 | 10/2013 | Mullet et al. | |
| 2013/0276995 A1 | 10/2013 | Mullet et al. | |
| 2014/0014281 A1 | 1/2014 | Mullet et al. | |
| 2014/0216666 A1 | 8/2014 | Smith | |
| 2014/0305601 A1 | 10/2014 | Mullet et al. | |
| 2014/0360684 A1 | 12/2014 | Bohlen | |
| 2014/0360685 A1 * | 12/2014 | Bohlen | E06B 9/62 |
| | | | 160/317 |
| 2015/0047795 A1 | 2/2015 | Bohlen | |
| 2015/0059992 A1 | 3/2015 | Liu | |

(56) References Cited

U.S. PATENT DOCUMENTS

| | | | |
|---|---|---|---|
| 2015/0191973 A1* | 7/2015 | Bohlen | E06B 9/80 160/291 |
| 2015/0275575 A1* | 10/2015 | Haarer | E06B 9/42 160/315 |
| 2015/0284999 A1* | 10/2015 | Liu | E06B 9/80 242/396 |
| 2015/0285000 A1* | 10/2015 | Liu | E06B 9/80 242/396 |
| 2015/0368968 A1 | 12/2015 | Smith | |
| 2015/0376941 A1 | 12/2015 | Fujita | |
| 2016/0010390 A1* | 1/2016 | Smith | E06B 9/60 160/302 |
| 2016/0083999 A1 | 3/2016 | Chen | |
| 2016/0130866 A1 | 5/2016 | Buccola, Jr. | |
| 2016/0130871 A1 | 5/2016 | Pham | |
| 2016/0138333 A2* | 5/2016 | Bohlen | E06B 9/62 160/310 |
| 2016/0258211 A1* | 9/2016 | Smith | E06B 9/38 |
| 2016/0290043 A1 | 10/2016 | McPherson, Jr. | |
| 2017/0107760 A1* | 4/2017 | Campagna | E06B 9/60 |
| 2017/0130528 A1* | 5/2017 | Anthony | E06B 9/80 |
| 2017/0175440 A1* | 6/2017 | Bohlen | E06B 9/80 |
| 2018/0179814 A1* | 6/2018 | Kwak | E06B 9/42 |
| 2018/0216404 A1* | 8/2018 | Fisher | E06B 9/60 |

FOREIGN PATENT DOCUMENTS

| | | | | |
|---|---|---|---|---|
| EP | 2899359 A1 * | 7/2015 | | E06B 9/50 |
| WO | WO-2012064270 A1 * | 5/2012 | | E06B 9/42 |

* cited by examiner

ROLLER SHADE WITH A PRETENSIONED SPRING AND METHOD FOR PRETENSIONING THE SPRING

BACKGROUND OF THE INVENTION

Technical Field

Aspects of the embodiments generally relate to roller shades, and more particularly to systems, methods, and modes for counterbalancing a roller shade with pretensioned spring and method for pretensioning the spring to lower the torque load on the motor of the roller shade throughout the rolling up or rolling down cycles of the roller shade.

Background Art

Motorized roller shades provide a convenient one-touch control solution for screening windows, doors, or the like, to achieve privacy and thermal effects. A motorized roller shade typically includes a rectangular shade material attached at one end to a cylindrical rotating tube, called a roller tube, and at an opposite end to a hem bar. The shade material is wrapped around the roller tube. An electric motor, either mounted inside the roller tube or externally coupled to the roller tube, rotates the roller tube to unravel the shade material to cover a window. To uncover the window, however, a lot of torque and motor power are required to initially lift the entire weight of the shade material and the hem bar. This is in particular detrimental to battery operated motors as rolling up the shade quickly drains the battery.

Various methods exist for counterbalancing roller shades using springs mounted inside the roller tubes in an effort to reduce torque requirements on shade motors. As the roller shade is unraveled, tension builds up in the spring. The tension is released when the roller shade is rolled up, thereby assisting the motor in lifting the shade material. One approach uses a conventional torsion spring comprising a plurality of coils. As a torsion spring is wound up, it builds up torque. When the torsion spring is let go, the amount of torque exerted by the torsion spring progressively reduces in a linear fashion as the torsion spring winds down. FIG. 1A shows a diagram 100 representing the performance of a conventional torsion spring in assisting rolling up an exemplary sized roller shade. Line 105 represents the torque profile necessary to roll up an exemplary sized roller shade from a rolled down position, when the shade material is fully unraveled, up to a rolled up position, when the shade material is fully wrapped about the roller tube. Initially, more torque is required to lift the entire weight of the fully unraveled shade material and the hem bar as represented by maximum torque ($T_{max}$) value 102. As the roller tube turns, the shade material wraps around the roller tube, resulting in less shade material hanging from the roller tube. Accordingly, as the roller tube keeps turning, less torque is required to lift the weight of the remaining shade material until a minimum torque ($T_{min}$) value 103 is reached. Line 106 represents the torque exerted by the torsion spring during the roller shade travel. As shown, the torsion spring torque 106 decreases at a slope in a linear fashion to a zero value as the torsion spring winds down.

Currently, a torsion spring is chosen with a torque 106 that approaches the $T_{max}$ value 102 required to lift the shade material and the hem bar. The resulting torque, shown by line 108 in the figure, required to be exerted by the motor to roll up the roller shade is equal to the difference between the torque of the roller shade 105 and the spring torque 106. FIG. 1B shows a diagram 101 representing the resulting power 110 required of the motor to roll up the shade. As the roller shade begins to roll up from a fully unrolled position, the torsion spring releases its built up torsion energy. Then its energy progressively diminishes as the roller shade continues to roll up. At the end of the rolling up cycle, the torsion spring unravels back to zero torsion assistance. Thus, a conventional torsion spring assists the motor significantly more when the roller shade begins to roll up than during the remainder of the rolling up cycle. In the example of FIGS. 1A and 1B, initially about 0.1 N m of torque and less than 1 W of power are required to lift up the roller shade. That number climbs up to above 0.8 N m of torque and above 6 W of power at the end of the roll up cycle. Thus, while the conventional torsion spring decreases the amount of torque required to roll up the roller shade in the beginning, the amount of torque and power required to finish rolling up the roller shade remains quiet high.

Counterbalancing systems exist that pretension the spring in the roller shade to further assist in rolling up the roller shade. One such system allows pretensioning the spring during the installation of the roller shade. However, field pretensioning is often done incorrectly, leaving the customer unsatisfied with the performance of the product. Therefore, it is desired to have a factory settable pretension of a spring. Other systems exist that allow factory settable pretensioning by providing means that temporary hold the pretension until the roller shade is installed. Thereafter, the pretension is held by the weight of the shade material. However, this preset pretension often dissipates during the continual operation of the shade, when the shade is knocked down or hit accidentally, or when the shade needs to be removed and reinstalled. Other systems required complex field adjustment and complicated motorized pretensioning.

Therefore, a need has arisen for systems, methods, and modes for counterbalancing a roller shade with a pretensioned spring and method for pretensioning the spring to lower the torque load on the motor of the roller shade throughout the rolling up or rolling down cycles of the roller shade. Additionally, a need has arisen for systems, methods, and modes for counterbalancing a roller shade with pretensioned spring that can be pretensioned at the factory to a preset amount and which locks and continuously maintains the pretension.

SUMMARY OF THE INVENTION

It is an object of the embodiments to substantially solve at least the problems and/or disadvantages discussed above, and to provide at least one or more of the advantages described below.

It is therefore a general aspect of the embodiments to provide systems, methods, and modes for counterbalancing a roller shade with pretensioned spring and method for pretensioning the spring to lower the torque load on the motor of the roller shade throughout the rolling up or rolling down cycles of the roller shade.

It is also an aspect of the embodiments to provide systems, methods, and modes for counterbalancing a roller shade with pretensioned spring that can be pretensioned at the factory to a preset amount and which locks and continuously maintains the pretension.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Further features and advantages of the aspects of the embodiments, as well as the structure and operation of the various embodiments, are described in detail below with reference to the accompanying drawings. It is noted that the aspects of the embodiments are not limited to the specific embodiments described herein. Such embodiments are presented herein for illustrative purposes only. Additional embodiments will be apparent to persons skilled in the relevant art(s) based on the teachings contained herein.

DISCLOSURE OF INVENTION

According to one aspect of the embodiments, a roller shade is provided, comprising: a roller tube; a gudgeon pin comprising a first stop and a second stop; a gudgeon body rotatably connected about the gudgeon pin and operably connected to the roller tube, wherein the gudgeon body comprises a through bore; a limit nut operably connected to the gudgeon body and adapted to axially travel along the gudgeon pin, within the through bore, and between the first stop and the second stop; a spring longitudinally extending from a first end to a second end; a first spring carrier connected to the first end of the spring and operably connected to the gudgeon pin; and a second spring carrier connected to the second end of the spring and operably connected to the roller tube.

According to another aspect, the rotation of the roller tube to roll down the roller shade causes rotation of the second end of the spring in a first direction with respect to the first end of the spring, thereby tensioning the spring. Further, rotation of the roller tube to roll up the roller shade causes rotation of the second end of the spring in a second direction, opposite to the first direction, with respect to the first end of the spring, thereby releasing the tension in the spring. The roller shade can be rolled up or rolled down by pulling or tugging on a hem bar, by pulling on a chain, or via a motor.

In another embodiment, the spring comprises a pretensioned spring and the limit nut abuts the first stop or the second stop thereby locking pretension in the pretensioned spring. In some aspects of the embodiments, during pretensioning of the pretensioned spring, the roller shade comprises: (i) the second spring carrier positioned within the roller tube such that the second spring carrier is operably connected to the roller tube; (ii) the gudgeon body positioned outside the roller tube; (iii) the gudgeon body rotating with respect to the roller tube, thereby causing the limit nut to rotate and axially travel in a first direction, until the limit nut comes in contact with the first stop or the second stop; (iv) after the limit nut comes in contact with the first stop or the second stop, the gudgeon body further rotating with respect to the roller tube a predetermined number of pretension turns, thereby causing the first spring carrier and the first end of the spring to rotate with respect to the second spring carrier and the second end of the spring; and (v) the gudgeon body inserted inside the roller tube thereby locking the pretension.

In another embodiment, the gudgeon pin comprises a proximal portion, a middle portion, and a distal portion, wherein the first stop is disposed between the proximal portion and the middle portion, and wherein the second stop is disposed between the middle portion and the distal portion. The gudgeon pin may further comprise a gudgeon pin tip disposed on a terminal end of the gudgeon pin that attaches to a mounting bracket. In another embodiment, at least one of the first stop and the second stop of the gudgeon pin comprises at least one of a ring, a pin, a screw, or any combination thereof. In one embodiment, the gudgeon pin travels axially within the through bore and the first stop and the second stop limit the axial travel of the gudgeon pin with respect to the gudgeon body.

In another embodiment, the gudgeon body is rotatably connected about the gudgeon pin via at least one ball bearing. The gudgeon body may comprise a flange radially extending therefrom that prevents the gudgeon body from sliding entirely into the roller tube. The gudgeon body may comprise at least one ball bearing cavity dimensioned to receive the at least one ball bearing therein. The gudgeon body may further comprise a wheel with an external surface that contacts an inner surface of the roller tube. In one embodiment, the gudgeon body comprises a plurality of teeth extending circumferentially about an external surface of the gudgeon body that form a friction fit between the external surface of the gudgeon body and an inner surface of the roller tube. In another embodiment, the gudgeon body further comprises a plurality of channels extending circumferentially about an external surface of the gudgeon body that mate with complementary projections radially extending from an inner surface of the roller tube.

In another embodiment, the roller shade comprises a spring mandrel connected to the gudgeon pin and wherein the spring is mounted about the spring mandrel. In one embodiment, the spring comprises a torsion spring.

In another embodiment, the gudgeon pin and the limit nut are threaded and wherein the limit nut is threadably connected to the gudgeon pin. The through bore may comprise a cross-section having a shape that complements and mates with a shape of the limit nut. For example, the limit nut and the cross-section of the through bore comprise at least one of the following shapes: a hexagon, a triangle, a square, a heptagon, an octagon, and a star.

In one embodiment, the second spring carrier comprises a wheel with an external surface that contacts an inner surface of the roller tube. The wheel of the second spring carrier may be dimensioned such that it is operably connected to the roller tube and can axially travel within the roller tube. Further, the wheel of the second spring carrier comprises a plurality of channels extending circumferentially about its external surface that mate with complementary projections radially extending from an inner surface of the roller tube.

According to another aspect of the embodiments, a roller shade is provided, comprising: a roller tube; a gudgeon pin comprising a first stop; a gudgeon body rotatably connected about the gudgeon pin and operably connected to the roller tube, wherein the gudgeon body comprises a through bore; a limit nut operably connected to the gudgeon body and adapted to axially travel along the gudgeon pin within the through bore; a spring longitudinally extending from a first end to a second end; a first spring carrier connected to the first end of the spring and operably connected to the gudgeon pin; a second spring carrier connected to the second end of the spring and operably connected to the roller tube; wherein the limit nut abuts the first stop when the roller shade is in a rolled up position, and wherein rotation of the roller tube to roll down the roller shade causes the limit nut to axially travel along the gudgeon pin, within the through bore, and away from the first stop. In another embodiment, the spring comprises a pretensioned spring, and wherein the limit nut abuts the first stop thereby locking pretension in the pretensioned spring.

According to another aspect of the embodiments, a roller shade is provided, comprising: a roller tube; a gudgeon pin comprising a first stop; a gudgeon body rotatably connected about the gudgeon pin and operably connected to the roller tube, wherein the gudgeon body comprises a through bore; a limit nut operably connected to the gudgeon body and axially travels along the gudgeon pin within the through bore; a first spring carrier operably connected to the gudgeon pin; a second spring carrier operably connected to the roller tube; a pretensioned spring comprising (a) a first end connected to the first spring carrier, and (b) a second end connected to the second spring carrier; wherein during pretensioning of the pretensioned spring, the roller shade comprises: the second spring carrier positioned within the roller tube such that the second spring carrier is operably connected to the roller tube; the gudgeon body positioned outside the roller tube; the gudgeon body rotating with respect to the roller tube, thereby causing the limit nut to rotate and axially travel in a first direction, until the limit nut comes in contact with the first stop; after the limit nut comes in contact with the first stop, the gudgeon body further rotating with respect to the roller tube a predetermined number of pretension turns, thereby causing the first spring carrier and the first end of the pretensioned spring to rotate with respect to the second spring carrier and the second end of the pretensioned spring; and the gudgeon body inserted inside the roller tube thereby locking the pretension.

According to some aspect of the embodiments, the method for pretensioning the spring comprises: (i) positioning the second spring carrier within the roller tube such that the second spring carrier is operably connected to the roller tube; (ii) positioning the gudgeon body outside the roller tube; (iii) rotating the gudgeon body with respect to the roller tube, thereby causing the limit nut to rotate and axially travel in a first direction, until the limit nut comes in contact with the first stop or the second stop; (iv) after the limit nut comes in contact with the first stop or the second stop, further rotating the gudgeon body with respect to the roller tube a predetermined number of pretension turns, thereby causing the first spring carrier and the first end of the spring to rotate with respect to the second spring carrier and the second end of the spring; and (v) inserting the gudgeon body inside the roller tube thereby locking the pretension.

According to some aspects of the embodiments, the predetermined number of pretension turns $N_p$ is determined according to the following formula:

$$N_p = \frac{T_{min\_offset}}{k}$$

where, $T_{min\_offset}$ is substantially equal to, or offset by a predetermined amount from, a minimum amount of torque required to finish rolling up the roller shade, and k is substantially equal to a torque slope of the roller shade.

In another embodiment, the torque slope k of the roller shade is determined according to the following formula:

$$k = \frac{T_{max} - T_{min}}{N_t}$$

where $T_{max}$ is substantially equal to a maximum amount of torque required to start rolling up the roller shade, $T_{min}$ is substantially equal to the minimum amount of torque required to finish rolling up the roller shade, and $N_t$ is a number of turns it takes to fully roll up the roller shade.

In another embodiment, the $T_{max}$ and $T_{min}$ are determined according to the following formulas:

$$T_{max} = r_{rt} \times (w_{sm} + w_{hb}) \quad T_{min} = r_{sm} \times w_{hb}$$

where, $r_{rt}$ is a radius of the roller tube, $w_{sm}$ is a weight of a shade material, $w_{hb}$ is a weight of a hem bar, and $r_{sm}$ is a radius of the shade material when it is fully wrapped around the roller tube.

According to another aspect of the embodiments, a method is provided for pretensioning a spring of a roller shade including a roller tube, a gudgeon pin having a first stop, a gudgeon body, a limit nut, a first spring carrier, and a second spring carrier, the method comprising: (i) positioning the gudgeon body and the first spring carrier outside the roller tube, wherein the first spring carrier is operably connected to the gudgeon pin and to a first end of the spring; (ii) positioning the second spring carrier within the roller tube such that the second spring carrier is operably connected to the roller tube, wherein the second spring carrier is connected to a second end of the spring, (iii) rotating the gudgeon body with respect to the roller tube about the gudgeon pin, thereby causing the limit nut to rotate and axially travel in a first direction along the gudgeon pin and within a through bore of the gudgeon body, until the limit nut comes in contact with the first stop, (iv) after the limit nut comes in contact with the first stop, further rotating the gudgeon body with respect to the roller tube a predetermined number of pretension turns, thereby causing the first spring carrier and the first end of the spring to rotate with respect to the second spring carrier and the second end of the spring; and (v) inserting the gudgeon body inside the roller tube thereby locking the pretension.

BRIEF DESCRIPTION OF THE DRAWINGS

The above and other objects and features of the embodiments will become apparent and more readily appreciated from the following description of the embodiments with reference to the following figures. Different aspects of the embodiments are illustrated in reference figures of the drawings. It is intended that the embodiments and figures disclosed herein are to be considered to be illustrative rather than limiting. The components in the drawings are not necessarily drawn to scale, emphasis instead being placed upon clearly illustrating the principles of the aspects of the embodiments. In the drawings, like reference numerals designate corresponding parts throughout the several views.

BRIEF DESCRIPTION OF THE SEVERAL VIEWS OF THE DRAWING

Figure 1A:
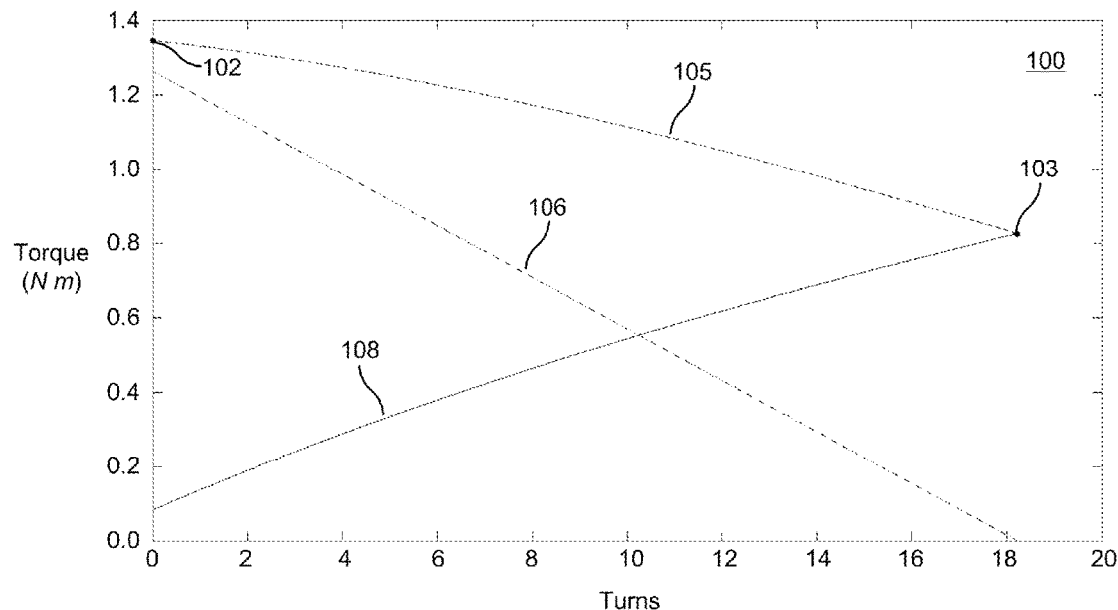
Figure 1B:
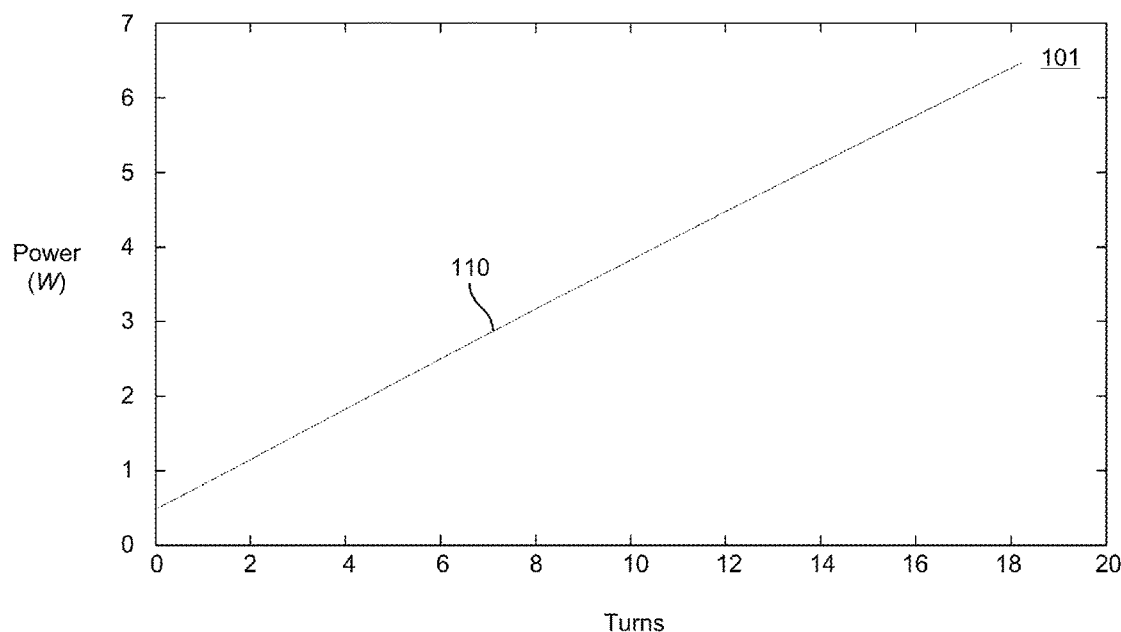
Figure 2A:
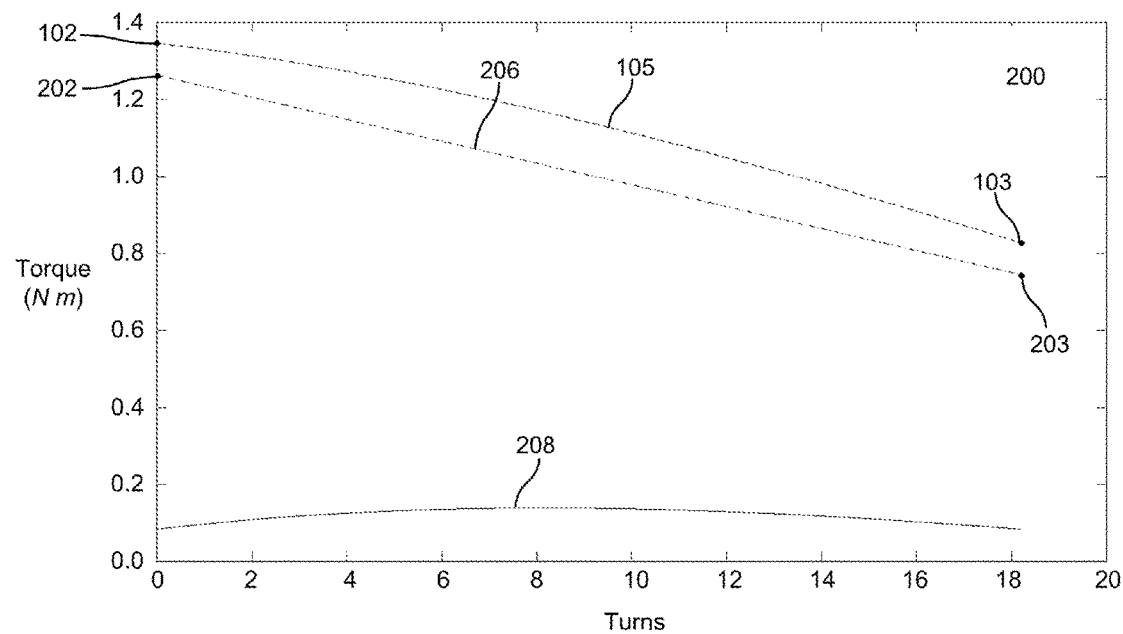
Figure 2B:
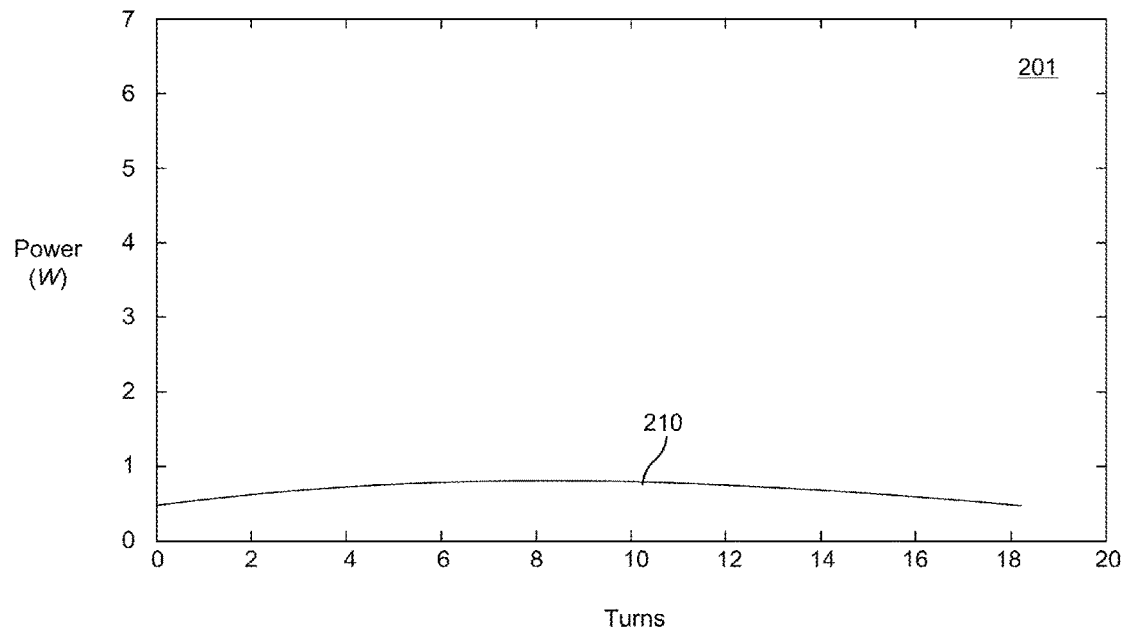
Figure 3A:
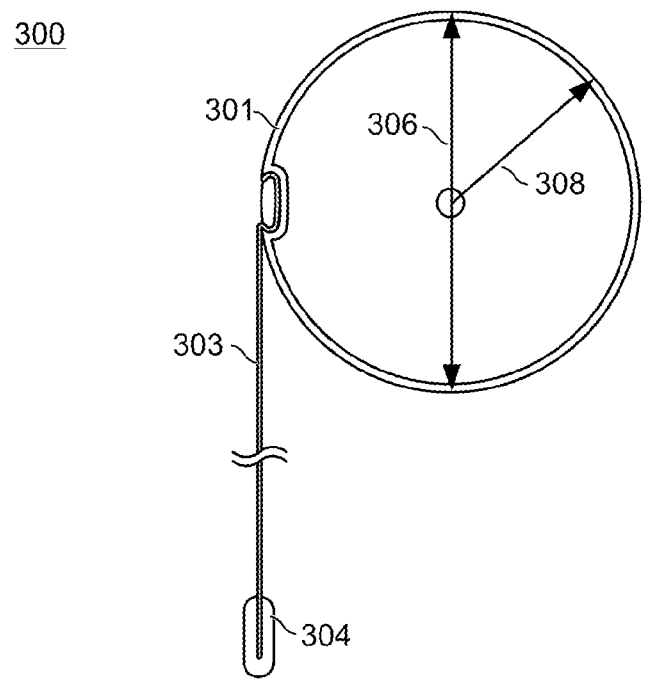
Figure 3B:
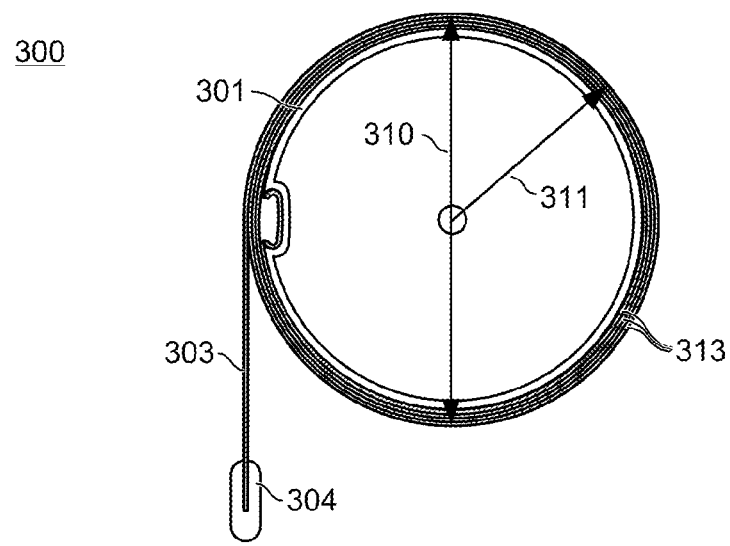
Figure 4:
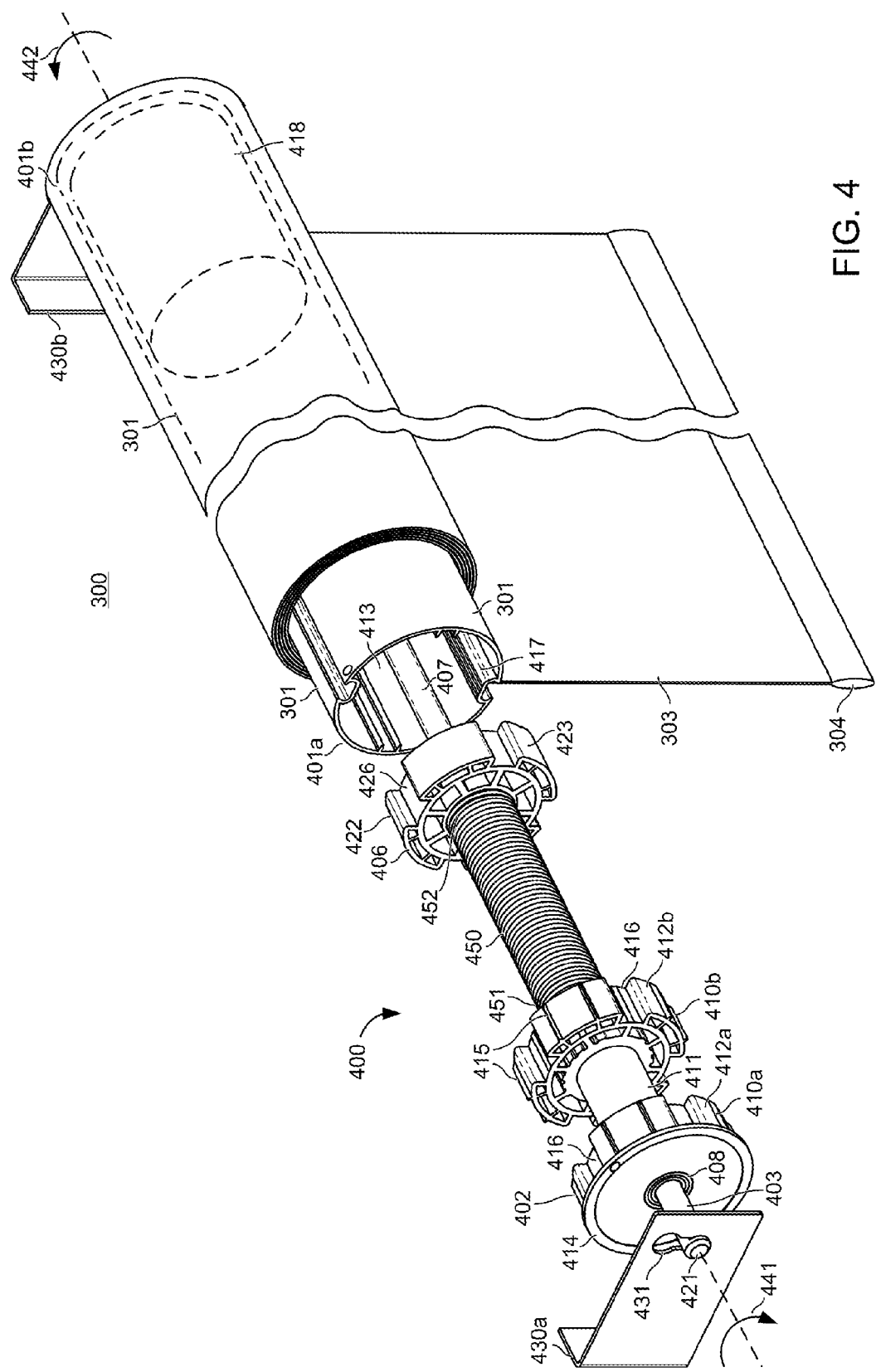
Figure 5:
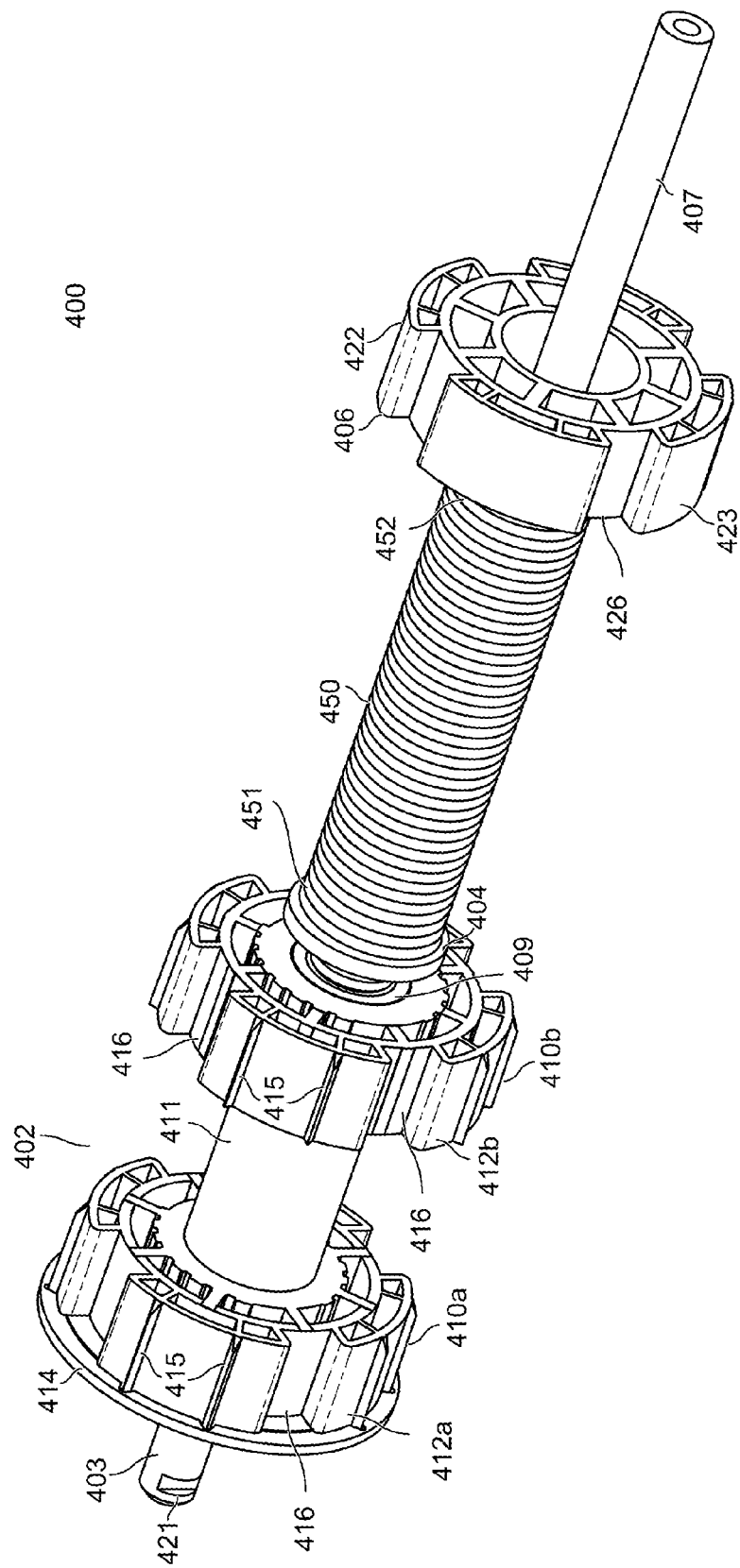
Figure 6:
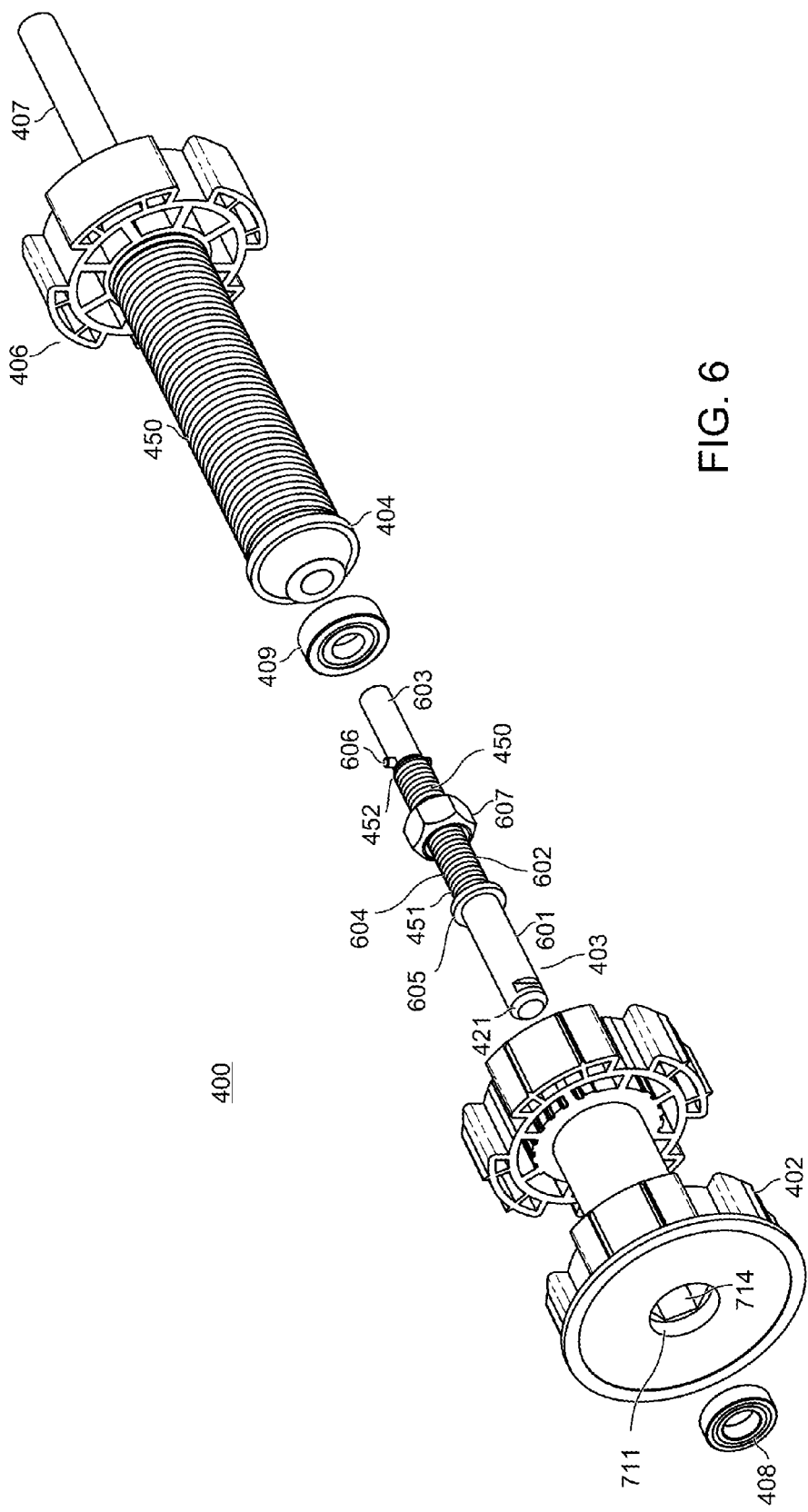
Figure 7:
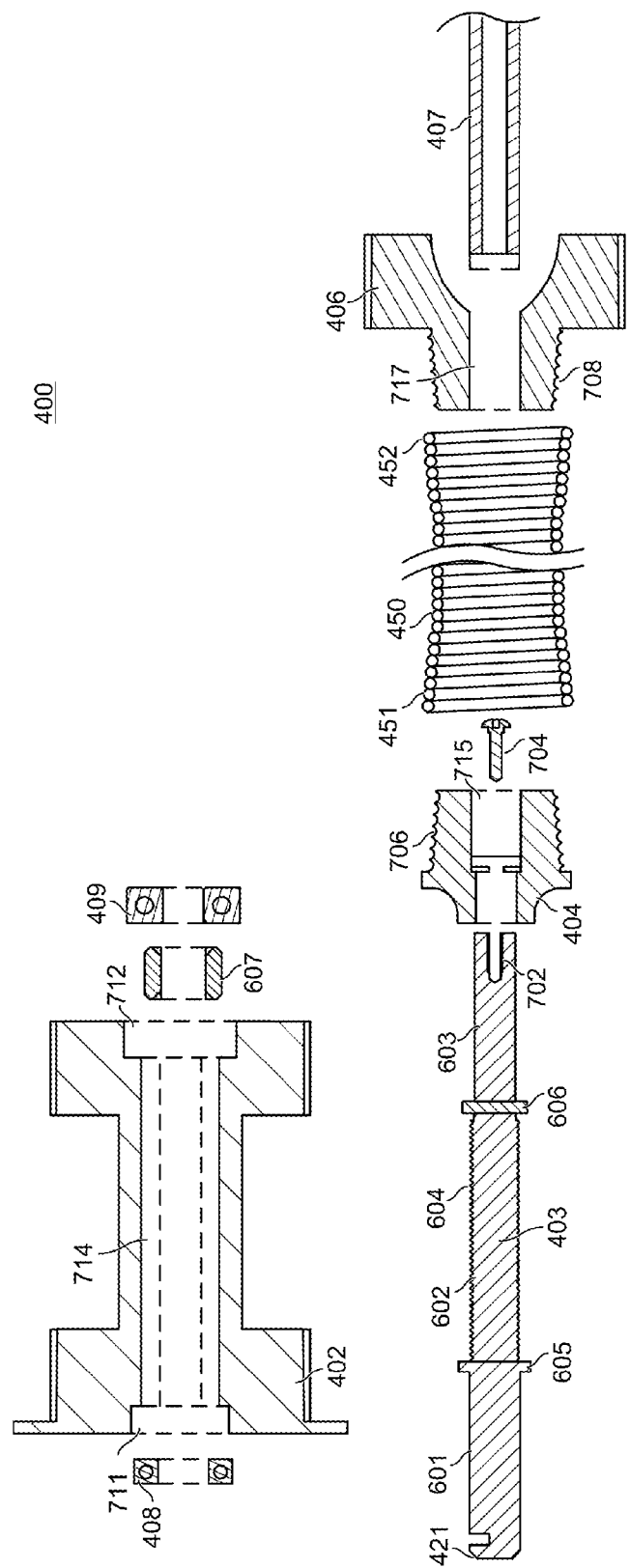
Figure 8A:
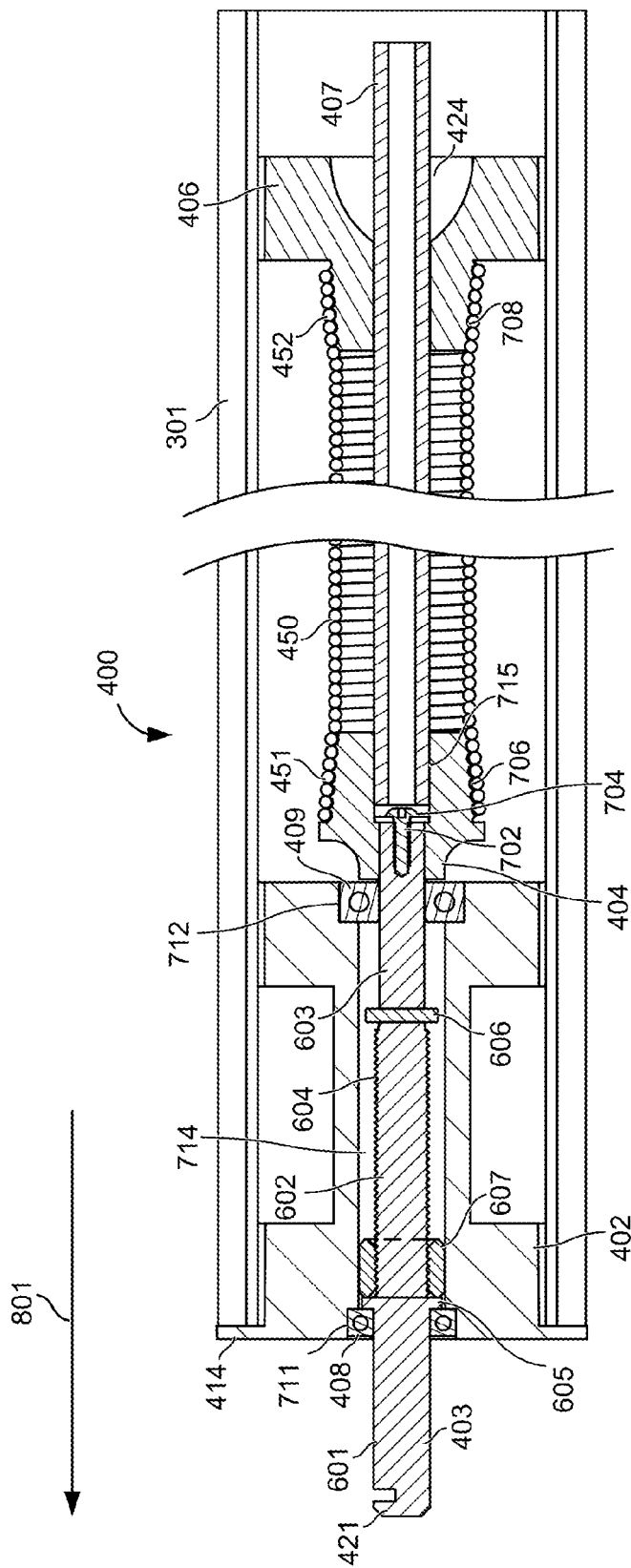
Figure 8B:
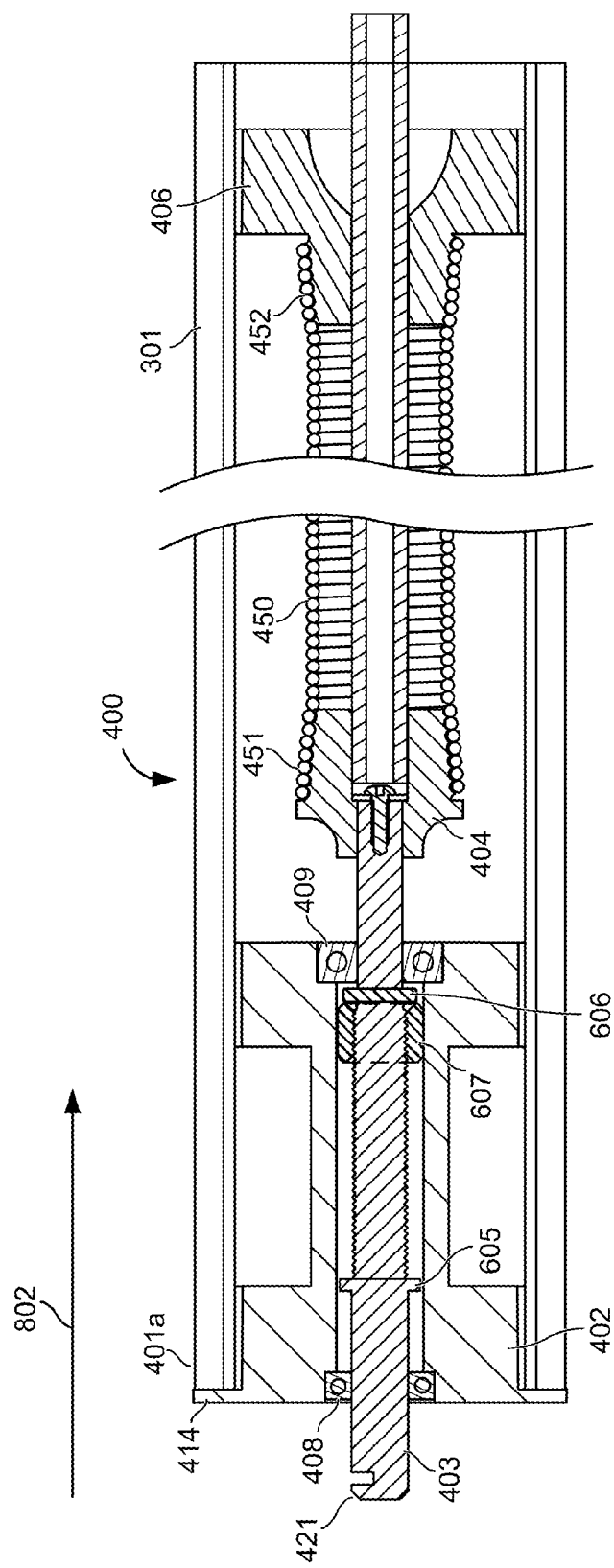
Figure 8C:
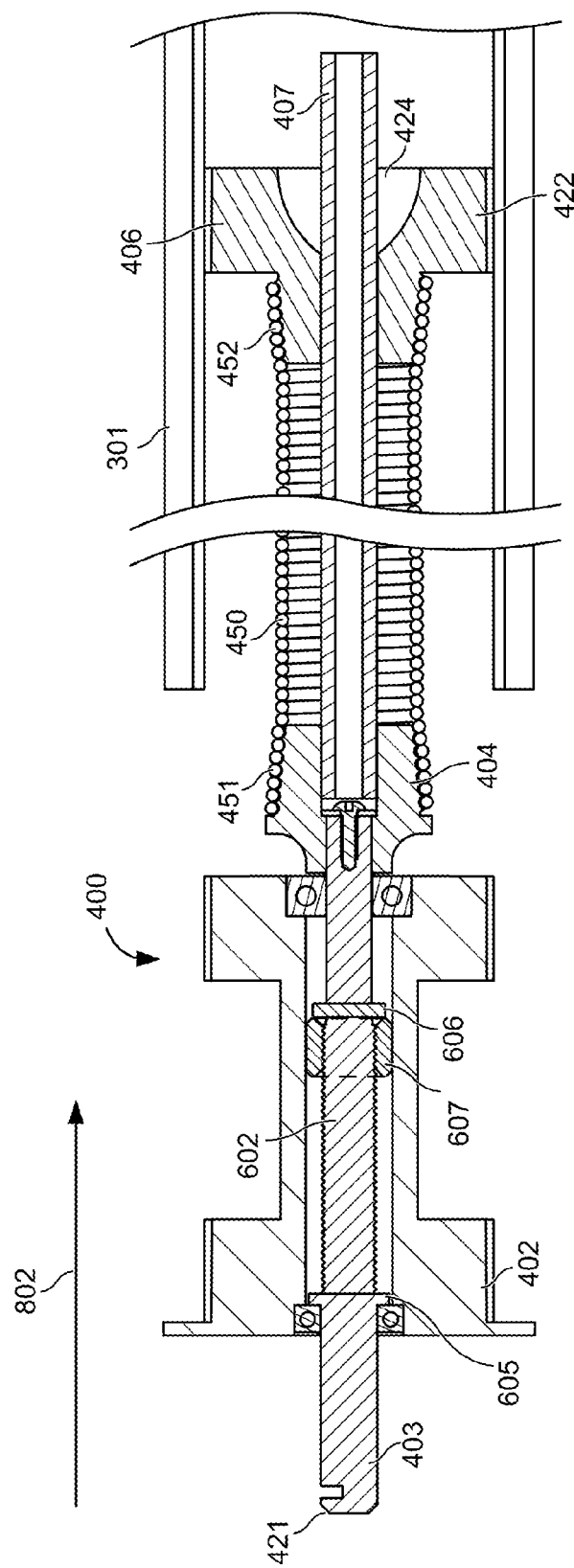
Figure 9:
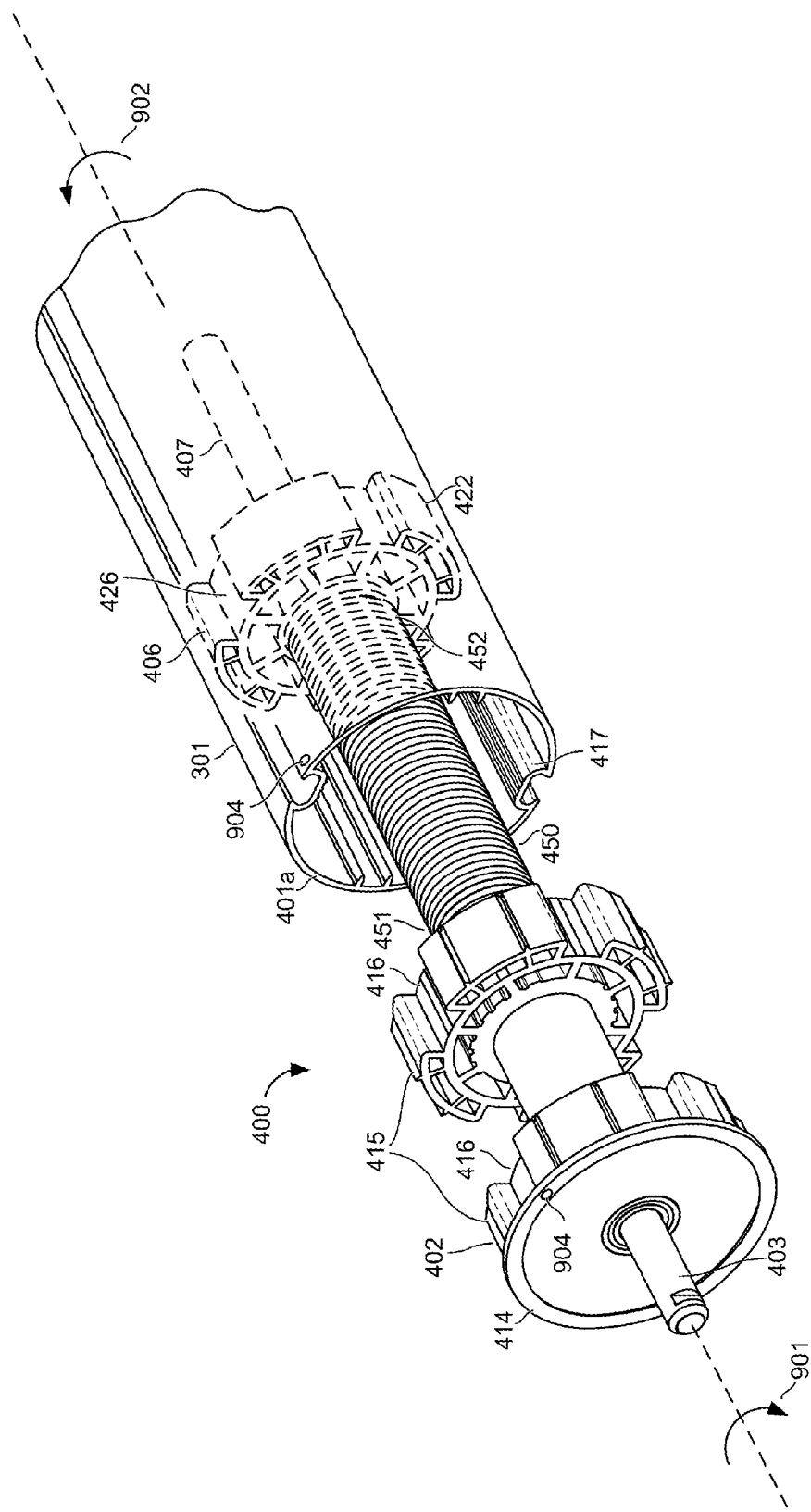
Figure 10:
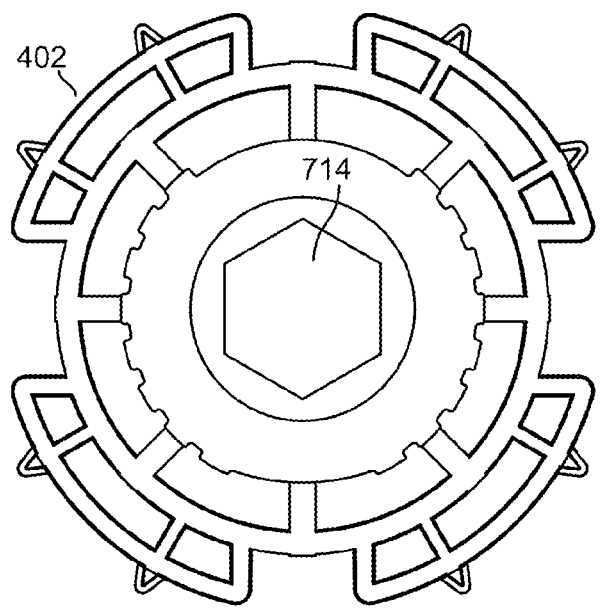

FIG. 1A illustrates a torque diagram of a prior-art roller shade using a conventional torsion spring;

FIG. 1B illustrates a power diagram of a motor required to lift the prior-art roller shade using the conventional torsion spring;

FIG. 2A illustrates a torque diagram of a roller shade using a pretensioned torsion spring according to one embodiment of the invention;

FIG. 2B illustrates a power diagram of a motor required to lift the roller shade using the pretensioned torsion spring according to one embodiment of the invention;

FIG. 3A illustrates an end view of a roller shade in a fully rolled down position according to one embodiment of the invention;

FIG. 3B illustrates an end view of the roller shade in a fully rolled up position according to one embodiment of the invention;

FIG. 4 illustrates a front perspective view of a roller shade including a counterbalancing assembly according to one embodiment of the invention;

FIG. 5 illustrates a rear perspective view of the counterbalancing assembly according to one embodiment of the invention;

FIG. 6 illustrates an exploded front perspective view of the counterbalancing assembly according to one embodiment of the invention;

FIG. 7 illustrates an exploded cross-sectional view of the counterbalancing assembly according to one embodiment of the invention;

FIG. 8A illustrates a cross-sectional view of a rolling tube and the counterbalancing assembly therein with a gudgeon pin and limit nut in a first position according to one embodiment of the invention;

FIG. 8B illustrates a cross-sectional view of the rolling tube and the counterbalancing assembly therein with the gudgeon pin and limit nut in a second position according to one embodiment of the invention;

FIG. 8C illustrates a cross-sectional view of the counterbalancing assembly partially extended out of the roller tube according to one embodiment of the invention;

FIG. 9 illustrates a front perspective view of the counterbalancing assembly partially extended out of the roller tube according to one embodiment of the invention; and FIG. 10 illustrates a rear view of a gudgeon body of the counterbalancing assembly according to one embodiment of the invention.

DETAILED DESCRIPTION OF THE INVENTION

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims.

Reference throughout the specification to "one embodiment" or "an embodiment" means that a particular feature, structure, or characteristic described in connection with an embodiment is included in at least one embodiment of the embodiments. Thus, the appearance of the phrases "in one embodiment" on "in an embodiment" in various places throughout the specification is not necessarily referring to the same embodiment. Further, the particular features, structures, or characteristics may be combined in any suitable manner in one or more embodiments.

LIST OF REFERENCE NUMBERS FOR THE ELEMENTS IN THE DRAWINGS IN NUMERICAL ORDER

The following is a list of the major elements in the drawings in numerical order.

100 Torque Diagram of a Roller Shade Using a Conventional Torsion Spring
101 Power Diagram of a Motor
102 Maximum Torque
103 Minimum Torque
105 Torque Profile of a Roller Shade
106 Torque of a Conventional Torsion Spring
108 Torque of a Motor
110 Power of a Motor
200 Torque Diagram of a Roller Shade Using a Pretensioned Torsion Spring
202 Maximum Torque
203 Minimum Torque
206 Spring Rate Slope
208 Torque of a Motor
210 Power of a Motor
300 Roller Shade
301 Roller Tube
303 Shade Material
304 Hem Bar
306 Roller Tube Diameter
308 Roller Tube Radius
310 Diameter of the Shade Material Wrapped on the Roller Tube
311 Radius of the Shade Material Wrapped on the Roller Tube
313 Shade Material Layers
400 Counterbalancing Assembly
401a First End
401b Second End
402 Gudgeon Body
403 Gudgeon Pin
404 First Spring Carrier
406 Second Spring Carrier
407 Spring Mandrel
408 First Ball Bearing
409 Second Ball Bearing
410a First Cylindrical Wheel
410b Second Cylindrical Wheel
411 Cylindrical Tube
412a External Surface
412b External Surface
413 Inner Surface
414 Flange
415 Teeth
416 Channels
417 Projections
418 Motor
421 Gudgeon Pin Tip
422 Cylindrical Wheel
423 External Surface
426 Channels
430a Mounting Bracket
430b Mounting Bracket
431 Mounting Hole
441 Clockwise Direction
442 Counterclockwise Direction
450 Spring
451 First End
452 Second End
601 Proximal Portion
602 Middle Portion
603 Distal Portion
604 Threads
605 First Stop
606 Second Stop
607 Limit Nut 702 Threaded Screw Hole
704 Threaded Screw
706 Threads
708 Threads
711 First Ball Bearing Cavity
712 Second Ball Bearing Cavity
714 Through Bore
715 Bore
717 Bore
801 Direction
802 Direction
901 Clockwise Direction
902 Counterclockwise Direction
904 Markings

LIST OF ACRONYMS USED IN THE
SPECIFICATION IN ALPHABETICAL ORDER

The following is a list of the acronyms used in the specification in alphabetical order.
N mm Newton Millimeter
N m Newton Meter
$N_t$ Number of Turns it Takes to Fully Roll Up the Roller Shade
k Torque Slope of the Roller Shade
$r_{rt}$ Radius of the Roller Tube
$r_{sm}$ Radius of the Shade Material When it is Fully Wrapped Around the Roller Tube
$T_{max}$ Maximum Torque
$T_{min}$ Minimum Torque
W Watts
$w_{hb}$ Weight of the Hem Bar
$w_{sm}$ Weight of the Shade Material

MODE(S) FOR CARRYING OUT THE
INVENTION

The different aspects of the embodiments described herein pertain to the context of counterbalancing and pretensioning roller shades, but is not limited thereto, except as may be set forth expressly in the appended claims. While the various aspects of the embodiments are described herein with regards to motorized roller shades, the embodiments are not necessarily limited thereto. For example, the embodiments described herein may be used to counterbalance and pretension manual roller shades or semi-manual roller shades, which roll up or roll down by pulling or tugging on a hem bar or by pulling on a chain. Additionally, while the roller shade is described herein for covering a window, the roller shade may be used to cover doors, wall openings, or the like. The embodiments described herein may further be adapted in other types of window or door coverings, such as inverted rollers, Roman shades, Austrian shades, pleated shades, blinds, shutters, skylight shades, garage doors, or the like.

For 40 years Crestron Electronics Inc. has been the world's leading manufacturer of advanced control and automation systems, innovating technology to simplify and enhance modern lifestyles and businesses. Crestron designs, manufactures, and offers for sale integrated solutions to control audio, video, computer, and environmental systems. In addition, the devices and systems offered by Crestron streamlines technology, improving the quality of life in commercial buildings, universities, hotels, hospitals, and homes, among other locations. Accordingly, the systems, methods, and modes of the aspects of the embodiments described herein, as embodied as 300 and 400 can be manufactured by Crestron Electronics Inc., located in Rockleigh, N.J.

Disclosed herein are systems, methods, and modes for counterbalancing a roller shade with one or more pretensioned springs and method for pretensioning the springs to lower the torque load on the motor of the roller shade throughout the rolling up or rolling down cycles of the roller shade. Disclosed are also systems, methods, and modes for counterbalancing a roller shade with one or more pretensioned springs that can be pretensioned at the factory to a preset amount and which continuously lock the pretension.

To efficiently counterbalance a roller shade, a preset number of pretensioning turns needs to be determined for a given roller shade and its spring. In one embodiment, a torsion spring is utilized. However, other types of springs may be used without departing from the scope of current embodiments. Referring to FIG. 2A, line 105 represents the roller shade torque profile across the number of turns required to roll up an exemplary sized roller shade from a rolled down position, when the shade material is fully unraveled, up to a rolled up position, when the shade material is fully wrapped up around the roller tube. The y-axis represents the torque required in Newton Meter (N m) to roll up a roller shade, and the x-axis represents the number of 360 degree turns the roller shade rotates during the rolling up cycle (i.e., traveling right along the x-axis). Initially, more torque is required to start lifting all the weight of the shade material and the hem bar. As the roller tube rotates, the shade material wraps around the roller tube, resulting in less shade material hanging from the roller tube. Accordingly, as the roller tube keeps rotating, less torque is required to lift the weight of the remaining shade material plus the hem bar. $T_{max}$ 102 represents the maximum torque required to start lifting the entire weight of the shade material and hem bar, while $T_{min}$ 103 represents the minimum torque required to finish lifting the shade material and the hem bar during the rolling up cycle.

Line 206 represents the spring rate slope of the roller shade's spring. It is desired that the $T_{max}$ 202 and $T_{min}$ 203 values of the spring be set to be substantially equal to the $T_{max}$ 102 and $T_{min}$ 103 values, respectively, of the roller shade profile 105. Alternatively, as shown in FIG. 2A, the $T_{max}$ 202 and $T_{min}$ 203 values of the spring may be slightly offset down by a predefined amount from the roller shade $T_{max}$ 102 and $T_{min}$ 103 values, respectively. Reducing the $T_{max}$ 202 and $T_{min}$ 203 values of the spring with respect to the roller shade $T_{max}$ 102 and $T_{min}$ 103 values will ensure that the shade material naturally drops down when the roller shade is rolled down and does not tend to roll back up. As shown in FIG. 2A, $T_{min}$ 103 required to finish lifting the roller shade is not zero. There is always some torque required to finish lifting the shade because of the weight of the hem bar across the width of the shade, some pulling created by the shade material, and the inertia and weight of the roller tube itself. Accordingly, $T_{min}$ set point 203 of the spring has to be brought up from zero to substantially equal to, or slightly offset below $T_{min}$ 103 of the roller shade. This is accomplished by pretensioning the torsion spring such that when the roller shade is fully rolled up, the torsion spring still exerts a preset amount of torque 203 that is substantially equal to or slightly offset below from $T_{min}$ 103 of the roller shade.

With optimally pretensioned torsion spring, the spring assists rolling up the roller shade throughout the rolling up cycle of the roller shade. As a result, the resulting torque 208 required to be exerted by the motor to roll up the roller shade is minimal and substantially steady throughout the rolling up cycle of the roller shade. Similarly, the resulting power 210 shown in FIG. 2B is significantly reduced and is substantially steady throughout the rolling up cycle of the roller shade. As illustrated in the example of FIGS. 2A and 2B, the maximum torque required to be exerted to lift an exemplary sized roller shade is below 0.15 N m, compared to above 0.8 N m of torque required to lift the same sized shade by a motor with the aforementioned prior art counterbalancing system. Similarly, the maximum power required to lift an exemplary sized roller shade is around 0.8 W, compared to 6 W of power required to lift the same sized shade by a motor with the aforementioned prior art counterbalancing system.

In addition, the optimally pretensioned torsion spring also assists the motor to steadily lower the roller shade throughout the entire rolling down cycle (i.e., traveling left along x-axis in FIG. 2A).

The torque profile 105 of a roller shade depends on various properties of the roller shade. For example, the torque profile 105 of a roller shade varies depending on various factors, such as the roller tube diameter and radius, the diameter and radius of the shade material as it wraps about the roller tube, the shade material thickness, the width and length of the shade material, the number of layers of the shade material about the roller tube, the weight of the shade material, and the weight of the hem bar. Depending on the window size and the fabric selection, the pretension parameters of the required torsion spring will change. The systems, methods, and modes of the embodiments described herein provide the ability to optimally pretension a torsion spring during assembly of the roller shade at the factory by determining the optimal number of pretension turns for a given roller shade such that the $T_{min}$ value 203 of the torsion spring corresponds to the $T_{min}$ value 103 of the roller shade. The embodiments described herein may be used to pretension torsion springs to be used in stock roller shades sold in a number of predetermined sizes and shade materials. The embodiments described herein may be used to quickly and precisely pretension torsion springs to be used in customized roller shades, during the assembly of the customized roller shades at the factory, right after the customer has placed their order.

To determine the preset number of pretension turns, initially the roller shade properties are determined. FIG. 3A illustrates an end view of a roller shade 300 in a fully rolled down position, and FIG. 3B illustrates an end view of the roller shade 300 in a fully rolled up position. The roller shade properties include one or more of the diameter 306 and radius 308 of the roller tube 301, the diameter 310 and radius 311 of the shade material 303 when it is fully wrapped on the roller tube 301, the shade material 303 thickness, the width and length of the shade material 303, the number of layers 313 of the shade material 303 about the roller tube 301 when it is fully wrapped on the roller tube 301, the weight of the shade material 303, and the weight of the hem bar 304.

For customizable roller shades, for example, initially a customer will measure the window dimensions and select the style of the roller shade they want. The customer may pick from a selection of mounting brackets and hardware, hem bars, fabric designs, fabric attributes, such as transparency, translucency, and blackout materials, and the like. A customer may use the Crestron® Design Tool, a one-stop Web-based platform for all the Crestron® Shading Solutions designing, available from Crestron Electronics, Inc. of Rockleigh, N.J. Then, the customer will submit their order to the manufacturer. The manufacturer may use computer software to convert the customer requirements to manufacturing specifications for production, as is known in the art. The manufacturing specifications specify, for example, the diameter 306 of the roller tube 301 to use, how long to cut the roller tube 301, how long and wide to cut the shade material 303, and what type of hardware to use in assembling the customized roller shade, including the type of hem bar 304. All of the above customized properties will drive the weight of the roller shade, and thereby the roller shade torque profile 105.

Using the aforementioned roller shade properties, the $T_{max}$ and $T_{min}$ values of the roller shade 300 are determined. $T_{max}$ represents the maximum torque required to start rolling up the roller shade 300 when the shade material 303 is fully unraveled. Thus, as shown in FIG. 3A, the entire weight of the shade material 303 plus the weight of the hem bar 304 need to be pulled up. $T_{max}$ is determined by the following formula:

$$T_{max} = r_{rt} \times (w_{sm} \times w_{hb}) \quad (1)$$

where,
$r_{rt}$ is the radius 308 of the roller tube 301, which is used because all the shade material 303 is already unraveled,
$w_{sm}$ is the weight of the entire shade material 303, and
$w_{hb}$ is the weight of the hem bar 304.

$T_{min}$ represents the minimum torque required to finish rolling up the roller shade 300 when the shade material 303 is fully wrapped around the roller tube 301. As shown in FIG. 3B, the only weight that is being lifted at the end of the rolling up cycle is the weight of the hem bar 304. $T_{min}$ is determined by the following formula:

$$T_{min} = r_{sm} \times w_{hb} \quad (2)$$

where,
$r_{sm}$ is the radius 311 of the shade material when it is fully wrapped around the roller tube 301, and
$w_{hb}$ is the weight of the hem bar 304.

Exemplary $T_{max}$ 102 and $T_{min}$ 103 values are illustrated in FIG. 2A.

Using the $T_{min}$ and $T_{max}$ values, a slope is determined for the natural torque profile of the roller shade. The slope is determined by the following formula:

$$k\left(\frac{N\ mm}{turn}\right) = \frac{T_{max} - T_{min}}{N_t} \quad (3)$$

where,
k is the torque slope of the roller shade, and
$N_t$ is the number of turns it takes to fully roll up the roller shade.

Optionally, as discussed above, the $T_{max}$ 202 and $T_{min}$ 203 values of the spring may be offset from the natural torque profile 105 of the roller shade. This can be accomplished through a static or a percentage offset, as follows:

$$T_{min\_offset}(N\ mm) = T_{min} - offset \quad (4)$$

$$T_{min\_offset}(N\ mm) = T_{min} \times (1 - offset_{percentage}) \quad (5)$$

Once the slope and offset $T_{min}$ 203 value are determined, the number of preset pretension turns can be determined using the following formula:

$$N_p = \frac{T_{min\_offset}}{k} \tag{6}$$

where, $N_p$ is the number of pretensioned turns, and k is the torque slope of the roller shade.

If no offset is being made, then $T_{min\_offset}$ is substituted with $T_{min}$ 103 in the above formula. As shown, the number of pretension turns is determined using the slope of the natural torque profile of the roller shade to bring the minimum torque of the torsion spring up from zero torque to the desired minimum torque value, in this example $T_{min}$ 203. As a result, when the determined preset number of pretension turns are put in the spring, $T_{min}$ 203 of the spring is either substantially equal to $T_{min}$ 103 of the roller shade 300, or as shown in FIG. 2A, it is slightly offset below $T_{min}$ 103 of the roller shade 300 by a predetermined amount.

The next section describes an embodiment of a roller shade counterbalancing assembly that allows for pretensioning the torsion spring. Using the counterbalancing assembly, a torsion spring can be pretensioned at the factory to a preset number of turns as required for a particular roller shade 300 to effectively counterbalance the roller shade 300 according to the systems, methods, and modes described above. The counterbalancing assembly of the embodiments described herein obviates field adjustments or more complicated motorized pretensioning.

Referring to FIG. 4, there is shown a front perspective view of a roller shade 300 including a counterbalancing assembly 400 according to one embodiment. Roller shade 300 generally comprises a roller tube 301, shade material 303, hem bar 304, counterbalancing assembly 400, and motor 418. Roller tube 301 is generally cylindrical in shape and longitudinally extends from a first end 401a to a second end 401b. Assembly 400 fits within the roller tube 301 at its first end 401a. The second end 401b of roller tube 301 includes the motor 418 that rotates the roller tube 301. A first end of the shade material 303 is connected to the roller tube 301 and a second end of the shade material 303 is connected to the hem bar 304. Shade material 303 wraps around roller tube 301. The roller shade 300 is mounted on a window via mounting bracket 430a connected to the first end 401a and mounting bracket 430b connected to the second end 401b of the roller tube 301.

FIGS. 5-8C illustrate various views of the counterbalancing assembly 400 in greater detail. Specifically, FIG. 5 shows a rear perspective view of assembly 400; FIG. 6 shows an exploded front perspective view of assembly 400; FIG. 7 shows an exploded cross-sectional view of assembly 400; and FIGS. 8A-8C show cross-sectional views of assembly 400 inside a roller tube 301 in various positions. Referring to FIGS. 4-7, counterbalancing assembly 400 includes a gudgeon body 402, a gudgeon pin 403, a first ball bearing 408 (FIG. 6), a second ball bearing 409 (FIG. 6), a first spring carrier 404 (FIG. 6), a torsion spring 450, a second spring carrier 406, and a spring mandrel 407.

The gudgeon body 402 of assembly 400 is rotatably connected about the gudgeon pin 403. It is inserted into the roller tube 301 and is operably connected to the roller tube 301 such that rotation of the roller tube 301 also rotates the gudgeon body 402. The gudgeon body 402 includes a pair of first and second cylindrical wheels 410a and 410b interconnected via a cylindrical tube 411. First and second wheels 410a and 410b comprise external surfaces 412a and 412b, respectively, which contact the inner surface 413 of the roller tube 301. First wheel 410a comprises a flange 414 radially extending therefrom. Flange 414 prevents the gudgeon body 402 from sliding entirely into the roller tube 301 (see FIG. 8A). First and second wheels 410a and 410b further comprise a plurality of teeth 415 and a plurality of channels 416 extending circumferentially about the external surfaces 412a and 412b of first and second wheels 410a and 410b. Teeth 415 are used to form a friction fit between the external surfaces 412a and 412b of the first and second wheels 410a and 410b, respectively, and the inner surface 413 of roller tube 301. Channels 416 mate with complementary projections 417 radially extending from the inner surface 413 of roller tube 301 to prevent first and second wheels 410a and 410b from rotating with respect to the roller tube 301.

Referring to FIGS. 7 and 8A, the gudgeon body 402 defines a first ball bearing cavity 711, a second ball bearing cavity 712, and a through bore 714 therebetween. In various embodiments, the gudgeon body 402 comprises aluminum, stainless steel, plastic, fiberglass, or other materials known to those skilled in the art.

Referring to FIGS. 6, 7 and 8A, the gudgeon pin 403 comprises a proximal portion 601, a middle portion 602, and a distal portion 603. The proximal portion 601 includes gudgeon pin tip 421 disposed on the terminal end of the proximal portion 601 to attach the roller shade 300 to mounting bracket 430a. A first stop 605 is disposed on the gudgeon pin 403 between the proximal portion 601 and the middle portion 602. A second stop 606 is disposed on the gudgeon pin 403 between the middle portion 602 and the distal portion 603. The first stop 605 may comprise ring shaped body radially extending from the gudgeon pin 403. The second stop 606 may comprise a pin or a screw transversely extending through the gudgeon pin 403. Second stop 606 may be removed to allow limit nut 607 to be assembled with the gudgeon pin 403. Alternatively, first stop 605 may comprise a pin or a screw and second stop 606 may comprise ring shaped body. In another embodiment, stops 605 and 606 may be substantially identical and may both comprise ring shaped bodies, pins, or screws. The middle portion 602 comprises threads 604 thereon that rotationally receive a threaded limit nut 607. Limit nut 607 may comprise a hexagonal cross section. Although a hexagonal limit nut 607 is illustrated, other shaped nuts may be used, including but not limited to triangle, square, heptagon, octagon, star, or the like. Limit nut 607 may rotatably travel along the middle portion 602, but its travel is limited by first and second stops 605 and 606 on either side of the middle portion 602. As shown in FIG. 7, gudgeon pin 403 further comprises a threaded screw hole 702 dimensioned and arranged to receive a threaded screw 704 to attach the gudgeon pin 403 to spring mandrel 407. In various embodiments, the gudgeon pin 403 comprises aluminum, stainless steel, or other materials known to those skilled in the art.

The first and second ball bearings 408 and 409 generally comprise an outer race, an inner race, and a plurality of balls disposed therebetween, as is well known in the art. In various embodiments, the ball bearings 408, 409 each comprise aluminum or stainless steel. The first ball bearing 408 fits within first ball bearing cavity 711 of the gudgeon body 402 and the second ball bearing 409 fits within the second ball bearing cavity 712 of the gudgeon body 402 (e.g., via friction fit, adhesive, or other means). The first ball bearing 408, through bore 714 of the gudgeon body 402, and the second ball bearing 409 receive the gudgeon pin 403 therein, as shown in FIG. 8A. Particularly, the first ball bearing 408 slidably and rotationally receives the proximal portion 601 of the gudgeon pin 403 and the second ball bearing 409 slidably and rotationally receives the distal portion 603 of the gudgeon pin 403. First and second ball bearings 408 and 409 allow the gudgeon body 402 to rotate with respect to the gudgeon pin 403 to allow the motor 418 rotate the roller tube 301 and thereby gudgeon body 402 with respect to the gudgeon pin 403 to roll up or roll down the roller shade 300.

In addition, first and second ball bearings 408 and 409 allow the gudgeon pin 403 to travel axially with respect to the gudgeon body 402. First and second stop 605 and 606 limit the axial movement of the gudgeon pin 403 with respect to the gudgeon body 402. In other words, as shown in FIG. 8A, gudgeon pin 403 may slide out of the gudgeon body 402 in direction 801 until the first stop 605 contacts the first ball bearing 408. First stop 605 prevents gudgeon pin 403 from further extending out of the gudgeon body 402. As shown in FIG. 8B, gudgeon pin 403 may slide into the gudgeon body 402 in direction 802 until the second stop 606 contacts the second ball bearing 409. Second stop 606 prevents gudgeon pin 403 from further extending into the gudgeon body 402. In another embodiment, through bore 714 may comprise a first inner projection or a flange at its first end that comes in contact with the first stop 605 and a second inner projection or a flange at its second end that comes in contact with the second stop 606. The distance the gudgeon pin 403 may move in and out of the gudgeon body 402 is determined by the location of the first and second stops 605 and 606 on the gudgeon pin 403. Second stop 606 is located at a predetermined distance from the gudgeon pin tip 421, which is large enough to prevent the gudgeon pin tip 421 from fully extending into the gudgeon body 402.

This axial movement of the gudgeon pin 403 in and out of the gudgeon body 402 allows for ease of installation of the roller shade 300. Typically, during the roller shade 300 mounting process, before the gudgeon pin 403 is to be coupled to a mounting bracket 430a (FIG. 4), the second end 401b of the roller tube 301, which includes the motor 418, is mounted right up against the mounting bracket 430b. Then, the gudgeon pin 403 is pushed into the gudgeon body 402 along its longitudinal axis (FIG. 8B) to provide maneuvering room for aligning the gudgeon pin tip 421 with a mounting hole 431 in the mounting bracket 430a. The installation technician can then extend the gudgeon pin 403 out of the gudgeon body 402 until the gudgeon pin tip 421 is inserted and received by the mounting hole 431 of the mounting bracket 430a. In addition, when a roller shade is installed, there needs to be some tolerance allowance within the window frame. For example, if the width of the window frame is measured slightly wrong with respect to the width of the roller shade 300, the axial movement of the gudgeon pin 403 may still allow the roller shade 300 to be installed within the window frame. Similarly, if the mounting brackets 430a and 430b are installed with slightly incorrect spacing between them, the axial movement of the gudgeon pin 403 may still allow the roller shade to be installed between the mounting brackets 430a and 430b.

Regardless of the axial position of the gudgeon pin 403 with respect to the gudgeon body 402, as shown in FIG. 8A, the middle portion 602 of the gudgeon pin 403, the first stop 605, the second stop 606, and the limit nut 607, remain disposed within the through bore 714 of the gudgeon body 402. The limit nut 607 is operably connected to the gudgeon body 402 such that rotation of the gudgeon body 402 causes rotation of the limit nut 607. As shown in greater detail in FIG. 10, illustrating the rear view of the gudgeon body 402, through bore 714 comprises a cross-sectional shape complementary to the shape of the limit nut 607. In this example, a hexagonal limit nut 607 and a hexagonal cross-sectional shaped through bore 714 are illustrated. Although, in other embodiments, other shapes may be used as discussed above. Referring back to FIG. 8A, the limit nut 607 rotates about the middle portion 602 via threads 604 and axially travels along middle portion 602 via threads 604 between first and second stops 605, 606. The hexagonal limit nut 607 mates with the hexagonal through bore 714 of the gudgeon body 402 such that rotation of gudgeon body 402 causes rotation of the limit nut 607. However, enough space is provided between the outer surface of the limit nut 607 and inner surface of through bore 714 such that limit nut 607 can axially travel within the through bore 714.

As the gudgeon body 402 rotates with respect to the gudgeon pin 403, the hexagonal inner surface of through bore 714 engages the hexagonal outer surface of limit nut 607 and causes the limit nut 607 to rotate with respect to the gudgeon pin 403. The limit nut 607, as a result, can axially travel along the threads 604 of the gudgeon pin 403, within the through bore 714, and between the first stop 605 and the second stop 606. Rotating the gudgeon body 402 counterclockwise with respect to the gudgeon pin 403 causes limit nut 607 to travel in direction 801 towards the gudgeon pin tip 421 until it engages first stop 605, as shown in FIG. 8A. Further counterclockwise rotation of the gudgeon body 402 with respect to the gudgeon pin 403 is hindered by the first stop 605. Rotating the gudgeon body 402 clockwise with respect to the gudgeon pin 403 causes limit nut 607 to travel away from the gudgeon pin tip 421 in direction 802 until it engages second stop 606, as shown in FIG. 8B. Further clockwise rotation of the gudgeon body 402 with respect to the gudgeon pin 403 is hindered by the second stop 606.

As shown in FIGS. 4, 7, and 8A, torsion spring 450 longitudinally extends from a first end 451 to a second end 452. Spring 450 is installed in the counterbalancing assembly 400 such that its first end 451 is connected to the first spring carrier 404. First spring carrier 404 comprises threads 706 for engaging and retaining the coils of the spring 450 at its first end 451. First spring carrier 404 is operably connected to the gudgeon pin 403 such that rotation of the gudgeon pin 403 causes rotation of the first spring carrier 404. First spring carrier 404 comprises a bore 715 therein that receives the spring mandrel 407 and the gudgeon pin 403 therein. As shown in FIG. 8A, threaded screw 704 and threaded screw hole 702 within the gudgeon pin 403 lock spring mandrel 407 and gudgeon pin 403 within the bore 715 of the first spring carrier 404. As a result, gudgeon pin 403, first spring carrier 404, spring mandrel 407, and first end 451 of spring 450 rotate together with respect to gudgeon body 402 and roller tube 301. In another embodiment, gudgeon pin 403, first spring carrier 404, spring mandrel 407, or any combinations thereof, may be constructed as a single piece of material. Spring 450 is mounted about the spring mandrel 407, which holds and stabilizes the spring 450 within the roller tube 301, preventing the spring 450 from sagging within the roller tube 301.

Spring 450 is connected at its second end 452 to the second spring carrier 406, which comprises threads 708 for engaging and retaining the coils of the spring 450 at its second end 452 (FIG. 7). Second spring carrier 406 is operably connected to the roller tube 301 such that rotation of the roller tube 301 also rotates the second spring carrier 406. As shown in FIG. 4, second spring carrier 406 comprises a cylindrical wheel 422 substantially similar in its outer configuration to the first and second cylindrical wheels 410a, 410b of the gudgeon body 402. Wheel 422 comprises an external surface 423 that slidably contacts the inner surface 413 of the roller tube 301. Wheel 422 also comprises a plurality of channels 426 extending circumferentially about the external surface 423 of wheel 422. Channels 426 mate with complementary projections 417 radially extending from the inner surface 413 of roller tube 301 to prevent wheel 422 from rotating with respect to the roller tube 301. Wheel 422 may or may not comprise teeth on its external surface 423, such as teeth 415. However, wheel 422 is dimensioned and constructed such that it can axially travel within the roller tube 301 via channels 426 and projections 417. This axial translation allows wheel 422 to be displaced axially when the gudgeon pin 403 is inserted into or extended out of the gudgeon body 402 during installation, as described above. Additionally, as the spring 450 is tensioned during its pretensioning at the factory or during the operation of the roller shade 300, it will extend or contract in length. The axial translation of second spring carrier 406 allows the spring 450 to freely extend or contract in length within the roller tube 301, as required. In various embodiments, the first and second spring carriers 404, 406 each comprise aluminum, stainless steel, plastic, fiberglass, or other materials known to those skilled in the art.

As shown in FIGS. 7 and 8A, second spring carrier 406 further comprises a bore 717 that slidably and rotationally retains the spring mandrel 407. In one embodiment, the bore 717 comprises a diameter slightly larger than the diameter of the spring mandrel 407, and contains lubricant therein such that the second spring carrier 406 may axially travel and rotate about the spring mandrel 407. In another embodiment, second spring carrier 406 may comprise one or more ball bearings, such as ball bearings 408, 409, to allow smooth axial and rotational movement of the second spring carrier 406 about the spring mandrel 407. Accordingly, the roller tube 301, which is operably connected to the second spring carrier 406, may rotate with respect to the spring mandrel 407 and the gudgeon pin 403. In addition, the second spring carrier 406 may axially travel with respect to the spring mandrel 407 as the spring 450 extends or contracts in length during pretensioning or operation of the roller shade 300.

The next section describes the method of pretensioning the roller shade in a clockwise direction using the counterbalancing assembly 400 according to one embodiment. As discussed in greater detail above, a preset number of pretension turns is determined based on the roller shade properties to efficiently counterbalance the roller shade 300. During the assembly of the roller shade 300 at the factory, the technician is provided with the specifications of the spring 450 and the amount of turns the spring 450 has to be pretensioned. The technician assembles the counterbalancing assembly 400 as shown in FIGS. 5 and 8A and as discussed in greater detail above.

As shown in FIGS. 8C and 9, to pretension the torsion spring 450 in a clockwise direction 901, the second spring carrier 406 is slid inside the roller tube 301 such that the second spring carrier 406 is operably connected to the roller tube 301. The gudgeon body 402 is positioned outside of the roller tube 301. Then, gudgeon body 402 is rotated in a clockwise direction 901 while the roller tube 301 is held stationary. While the gudgeon body 402 is rotated, the channels 426 on the cylindrical wheel 422 of the second spring carrier 406 and projections 417 on the roller tube 301 prevent the second spring carrier 406 from rotating with respect to the roller tube 301. If the limit nut 607 is located next to the first stop 605 or somewhere along the middle portion 602 of the gudgeon pin 403, the rotation of the gudgeon body 402 in clockwise direction 901 causes the limit nut 607 to travel along middle portion 602 of the gudgeon pin 403 in direction 802 away from the gudgeon pin tip 421 (FIG. 8C). During this rotation, the gudgeon body 402 and the limit nut 607 rotate about the gudgeon pin 403, while the gudgeon pin 403 remains stationary.

Gudgeon body 402 is rotated in clockwise direction 901 until the limit nut 607 contacts the second stop 606, as shown in FIG. 8C. In this position, the limit nut 607 cannot further travel with respect to the gudgeon pin 403 in direction 802. As a result, the limit nut 607 locks the gudgeon body 402 to the gudgeon pin 403 such that gudgeon body 402 can no longer rotate about the gudgeon pin 403 in a clockwise direction 901. Thereby, further clockwise rotation of the gudgeon body 402 also rotates in the clockwise direction 901 the gudgeon pin 403 as well as the first spring carrier 404 and the spring mandrel 407. Because the spring mandrel 407 can freely rotate within the second spring carrier 406 via bore 717, the first spring carrier 404 is rotated in clockwise direction 901, while the second spring carrier 406 remains stationary inside the roller tube 301 (FIG. 8C). This results in pretensioning the torsion spring 450 as its first end 451, connected to the first spring carrier 404, rotates in a clockwise direction 901 with respect to its second end 452, connected to the second spring carrier 406.

With the gudgeon body 402 outside the roller tube 301, the limit nut 607 locked with second stop 606, and starting with the torsion spring 450 in a relaxed state, pretensioning turns can be started by rotating the gudgeon body 402 with respect to the roller tube 301 until the predetermined number of pretensioning turns is reached. In one embodiment, the technician can use the channels 416 on the gudgeon body 402 and the projections 417 inside roller tube 301 as a guide to count the number of pretensioning turns. In another embodiment, the gudgeon body 402 and roller tube 301 may contain markings 904 (FIG. 9) to assist the technician to track the number of pretensioning turns made.

After the desired number of pretensioning turns is reached, the gudgeon body 402 is inserted inside the roller tube 301, as shown in FIG. 8B, until the flange 414 of the gudgeon body 402 contacts the first end 401a of the roller tube 301. In one embodiment, the preset number of pretension turns include full 360 degree turns. In another embodiment, the preset number of pretension turns may include less than 360 degree incremental turns. For example, the preset number of turns could comprise 35.5 turns. This is achieved by allowing the gudgeon body 402 to be inserted in the roller tube 301 in various radial locations. Including a plurality of channels 416 circumferentially arranged on the gudgeon body 402 and a plurality of projections 417 circumferentially arranged in the roller tube 301 allow the gudgeon body 402 and the roller tube 301 to be mated in various radial orientations with respect to each other. In one embodiment, the gudgeon body 402 and roller tube 301 may contain a plurality of markings 904 disposed circumferentially thereon and identifying full turns, half turns, quarter turns, or other fractional turns.

After its assembly, the roller shade 300 is shipped out to the customer to be installed in a window. The roller shade 300 is installed in the window with the shade material 303 fully wrapped up around the roller tube 301 and the gudgeon pin 403 held stationary by mounting bracket 430a.

According to an aspect of the embodiments, with the gudgeon body 402 inside the roller tube 301, the limit nut 607 continues to engage the second stop 606 locking the pretension. Particularly, while the gudgeon body 402 is inserted in the roller tube 301 and the gudgeon pin 403 is held stationary by mounting bracket 430a, the first spring carrier 404, first end 451 of the spring 450, and spring mandrel 407 are also held stationary during the operation of the roller shade 300. The pretension of spring 450 causes the second end 452 of the spring 450 to exert torque on the second spring carrier 406, and thereby on the roller tube 301 and gudgeon body 402, in a clockwise direction 441 with respect to the first end 451 of the spring, first spring carrier 404, and gudgeon pin 403. However, the gudgeon body 402 cannot further rotate with respect to the gudgeon pin 403 in a clockwise direction 441 because the engagement of the limit nut 607 and the second stop 606 prevents that rotation. Accordingly, the pretension is locked by the limit nut 607 and the second stop 606 preventing the torsion spring 450 from unwinding. Roller tube 301 and gudgeon body 402 can, however, rotate in a counterclockwise direction 442 with respect to the gudgeon pin 403. Rotation of the roller tube 301 and gudgeon body 402 in a counterclockwise direction 442 causes limit nut 607 to travel in direction 801 (FIG. 8A) towards the gudgeon pin tip 421. In addition, the counterclockwise rotation of the roller tube 301 in direction 442 rotates the second spring carrier 406 in a counterclockwise direction with respect to the stationary first spring carrier 404, which further tensions the torsion spring 450.

In operation, as discussed above, the roller tube 301 is pretensioned and cannot travel in a clockwise direction 441 with respect to the gudgeon pin 403. To roll down the roller shade 300, the roller tube 301 is rotated by motor 418 in a counterclockwise direction 442 causing the gudgeon body 402 and second spring carrier 406 to also rotate in a counterclockwise direction 442, while the first spring carrier 404 and gudgeon pin 403 remain stationary. This causes the torsion spring 450 to further build torque and forces the limit nut 607 to travel in direction 801 along middle portion 602 of gudgeon pin 403. The middle portion 602 of the gudgeon pin 403 comprises a length large enough such that limit nut 607 does not contact first stop 605 during the rolling down cycle. In one embodiment, limit nut 607 may contact first stop 605 at the end of the rolling down cycle. The pretensioning ensures that the rolling down cycle of the roller shade 300 starts at the desired $T_{min}$ value 203, as discussed above with reference to FIG. 2A. As the roller shade 300 rolls down, torsion spring 450 continues to build torque in a linear fashion (traveling left along the x-axis in the diagram of FIG. 2A) until the $T_{max}$ value 202 is reached. As the roller shade 300 rolls down, the shade material 303 gradually unravels and progressively more shade material 303 hangs down from the roller tube 301. The increasing weight of the shade material 303 and the hem bar 304 combined with torque exerted by the spring 450 assist the motor 418 to build torque in the torsion spring 450 throughout the rolling down cycle without the motor 418 requiring to exert much power, as shown by the exerted motor torque 208 and power 210.

When rolling up the shade 300, the torque that was built up in the torsion spring 450 during the rolling down cycle assists the motor 418 to roll up the shade 300 during the rolling up cycle. The torque exerted by spring 450 assists the motor 418 during the entire rolling up cycle (traveling right along the x-axis in the diagram of FIG. 3A). As the roller shade 300 rolls up, torsion spring 450 releases torque in a substantially linear fashion until the $T_{min}$ value 203 is reached. The decreasing weight of the shade material 303 and the hem bar 304 combined with the progressively released torque by the spring 450 effectively assist the motor 418 to roll up the roller shade 300 throughout the rolling up cycle without the motor 418 requiring to exert much power, as shown by the exerted motor torque 208 and power 210. Spring 450 assists the motor 418 to finish rolling up the shade material 303 all the way through the end of the rolling up cycle because the torque of the torsion spring 450 does not return to zero, but returns to the $T_{min}$ value 203 as a result of the pretension.

At the end of each rolling up cycle, the pretension put into the spring 450 continues to be locked as the limit nut 607 continues to engage the second stop 606 when the roller shade 300 is in a rolled up position. The pretension continues to be locked even if the roller shade 300 is knocked down or hit accidentally, or when the shade needs to be removed and reinstalled. The roller shade 300 may be easily serviced by a field technician or repaired as the roller shade may be easily disassembled and the factory specified pretension turns may be put back into the spring 450.

According to further aspects of the embodiments, pretensioning of the roller shade 300 can be accomplished in a counterclockwise direction in a substantially similar manner as discussed above, but with rotation of the gudgeon body 402 in a counterclockwise direction with respect to the roller tube 301 until limit nut 607 contacts and locks with the first stop 605 as shown in FIG. 8A. Then, a predetermined number of counterclockwise pretension turns can be put into the spring 450. Pretension of the roller shade 300 is locked in a counterclockwise direction and the roller shade can rotate in a clockwise direction to roll down the shade material 303, and in a counterclockwise direction to roll up the shade material 303 in substantially the same way as discussed above.

Aspects of the embodiments of the roller shade 300 allow the roller shade 300 to be assembled and installed as a standard roll or a reverse roll, without the need to redesign the roller shade or use custom parts. A standard roll roller shade is installed with the shade material rolling off the back side of the roller, showing the back of the fabric on the roller, as shown in FIG. 7. In a reverse roll, the shade material rolls off the front of the roller, hiding the roller. Typically, a standard roll roller shade comprises different parts than a reverse roll roller shade. The roller shade 300 of the embodiments, however, can be assembled and installed as either a standard roll or a reverse roll. Pretensioning the roller shade 300 in a counterclockwise direction allows the roller shade 300 to be quickly and easily assembled and installed for a reverse roll configuration.

Moreover, the counterbalancing assembly 400 of the present embodiment can be either installed on the left side of the roller tube 301 and the window, as shown in FIG. 7, or on the right side of the roller tube 301 and the window. Typically, a left counterbalancing assembly will need to comprise different parts than a right counterbalancing assembly, dictating how the roller shade needs to be installed in a window. Pretensioning the roller shade 300 in a clockwise direction, allows the roller shade 300 to be installed on the left side of the roller tube 301. Pretensioning the roller shade 300 in a counterclockwise direction, allows the roller shade 300 to be installed on the right side of the roller tube 300. This is beneficial where the location of the installation dictates the orientation of the roller shade. For example, where motor installation and/or an electrical connection may only be accomplished on the left side of the window.

In another embodiment, mounting brackets 430a and 430b may comprise ratcheting mechanisms to allow technicians to adjust the roller shade 300 during installation or maintenance. For example, the shade material 303 may have slipped off the roller tube 301 during installation or operation of the roller shade 300 such that excess material 303 will remain hanging after the roller shade 300 had finished the rolling up cycle. The limit nut 607 and stops 605 or 606 will prevent rotation of the roller shade with respect to the gudgeon pin 403, preventing manual adjustment of the roller tube 301. To solve this, the ratcheting mechanisms provided in the mounting brackets 430a and 430b allow the gudgeon pin 403 to rotate with respect to the mounting brackets 430a and 430b to roll up the excess shade material 303 onto the roller tube 301 until its correct position is reached. This ratcheting mechanism, however, does not affect the operation of the roller shade 300 during its rolling down or rolling up cycle. In another embodiment, a slip clutch mechanism may be used.

INDUSTRIAL APPLICABILITY

To solve the aforementioned problems, the aspects of the embodiments are directed toward systems, methods, and modes for counterbalancing and pretensioning a roller shade to lower the torque load on the motor of the roller shade throughout the rolling up or rolling down cycles.

The disclosed embodiments provide a system, and a method for counterbalancing a roller shade with a counterbalancing assembly having a pretensioned torsion spring and sizing and pretensioning the spring to lower the torque load on the motor of the roller shade throughout the rolling up or rolling down cycles. It should be understood that this description is not intended to limit the embodiments. On the contrary, the embodiments are intended to cover alternatives, modifications, and equivalents, which are included in the spirit and scope of the embodiments as defined by the appended claims. Further, in the detailed description of the embodiments, numerous specific details are set forth to provide a comprehensive understanding of the claimed embodiments. However, one skilled in the art would understand that various embodiments may be practiced without such specific details.

Although the features and elements of aspects of the embodiments are described being in particular combinations, each feature or element can be used alone, without the other features and elements of the embodiments, or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

The above-described embodiments are intended to be illustrative in all respects, rather than restrictive, of the embodiments. Thus the embodiments are capable of many variations in detailed implementation that can be derived from the description contained herein by a person skilled in the art. No element, act, or instruction used in the description of the present application should be construed as critical or essential to the embodiments unless explicitly described as such. Also, as used herein, the article "a" is intended to include one or more items.

All United States patents and applications, foreign patents, and publications discussed above are hereby incorporated herein by reference in their entireties.

ALTERNATE EMBODIMENTS

Alternate embodiments may be devised without departing from the spirit or the scope of the different aspects of the embodiments. The embodiments described herein may be used to counterbalance and pretension motorized roller shades as well as manual roller shades or semi-manual roller shades, which roll up or roll down by pulling or tugging on a hem bar or by pulling on a chain. The embodiments described herein may be used for covering windows as well as doors, wall openings, or the like. The embodiments described herein may further be adapted in other types of window or door coverings, such as inverted rollers, Roman shades, Austrian shades, pleated shades, blinds, shutters, skylight shades, garage doors, or the like.

Moreover, the process described herein for determining the number of preset pretensions and for pretensioning the spring is not meant to limit the aspects of the embodiments, or to suggest that the aspects of the embodiments should be implemented following this process. The purpose of the aforementioned process is to facilitate the understanding of one or more aspects of the embodiments and to provide the reader with one or many possible implementations of the processes discussed herein. The steps performed during the pretensioning process are not intended to completely describe the process but only to illustrate some of the aspects discussed above. It should be understood by one of ordinary skill in the art that the steps may be performed in a different order and that some steps may be eliminated or substituted.

The invention claimed is:

1. A roller shade comprising:
   a roller tube;
   a shade material operably connected to the roller tube and adapted to be rolled onto or from the roller tube between a rolled up position and a rolled down position;
   a gudgeon pin comprising a first stop, a second stop, and a longitudinal threaded portion extending therebetween;
   a pretensioned torsion spring comprising a first end and a second end and longitudinally extending therebetween;
   a first spring carrier connected to the first end of the spring and to the gudgeon pin;
   a second spring carrier connected to the second end of the spring and operably connected to the roller tube;
   a gudgeon body rotatably disposed about the gudgeon pin and operably connected to the roller tube, wherein the gudgeon body is at least partially inserted inside the roller tube, wherein the gudgeon body comprises a through bore that retains therein the first stop, the second stop, and the longitudinal threaded portion of the gudgeon pin;
   a threaded limit nut threadably connected to the threaded portion of the gudgeon pin between the first stop and the second stop, wherein the limit nut is operably connected to the through bore of the gudgeon body;
   wherein the gudgeon body is adapted to rotate with respect to the second spring carrier before being inserted into the roller tube to pretension the torsion spring, wherein after the gudgeon body is inserted inside the roller tube the limit nut is adapted to lock the pretension in the pretensioned torsion spring by abutting the first stop or the second stop when the shade material is in the rolled up position.

2. The roller shade of claim 1, wherein the roller shade locks the pretension in a clockwise direction when the limit nut abuts the first stop when the shade material is in the rolled up position, and wherein the roller shade locks the pretension in a counterclockwise direction when the limit nut abuts the second stop when the shade material is in the rolled up position.

3. The roller shade of claim 1, wherein the gudgeon pin is configured to travel axially within the through bore and wherein the first stop and the second stop limit the axial travel of the gudgeon pin to stay within the through bore.

4. The roller shade of claim 1, wherein the through bore of the gudgeon body comprises two inner flanges configured for retaining the first stop and the second stop of the gudgeon pin within the through bore.

5. The roller shade of claim 1, wherein at least one of the first stop and the second stop comprises at least one of a ring, a pin, a screw, or any combination thereof.

6. The roller shade of claim 1, wherein the shade material is rolled up or rolled down by pulling or tugging on a hem bar, by pulling on a chain, or via a motor.

7. The roller shade of claim 1, wherein further during the pretensioning of the torsion spring:
the second spring carrier is adapted to be positioned within the roller tube such that the second spring carrier is operably connected to the roller tube;
the gudgeon body is adapted to be positioned outside the roller tube;
the gudgeon body is adapted to rotate with respect to the roller tube, thereby causing the limit nut to rotate and axially travel in a first direction, until the limit nut comes in contact with the first stop or the second stop; and
after the limit nut comes in contact with the first stop or the second stop, the gudgeon body is adapted to further rotate with respect to the roller tube a predetermined number of pretension turns, thereby causing the first spring carrier and the first end of the spring to rotate with respect to the second spring carrier and the second end of the spring.

8. The roller shade of claim 1, wherein rotation of the roller tube rotates the second spring carrier and the gudgeon body with respect to the gudgeon pin and the first spring carrier.

9. The roller shade of claim 8, wherein rotation of the roller tube to roll down the shade material causes the limit nut to disengage the abutment with the first stop or the second stop and axially travel in a first direction within the through bore of the gudgeon body and along the threaded portion of the gudgeon pin.

10. The roller shade of claim 9, wherein rotation of the roller tube to roll up the shade material causes the limit nut to travel in a second direction, opposite the first direction, until the limit nut reengages the abutment with the first stop or the second stop.

11. The roller shade of claim 8, wherein rotation of the roller tube to roll down the shade material causes the second end of the spring to rotate with respect to the first end of the spring thereby further tensioning the spring.

12. The roller shade of claim 11, wherein rotation of the roller tube to roll up the shade material causes the second end of the spring to rotate with respect to the first end of the spring thereby releasing the further tension in the spring.

13. The roller shade of claim 12, wherein the second spring carrier is rotationally locked with the roller tube but is configured to axially travel within the roller tube as the spring extends in length during tensioning or contracts in length during release of the tension.

14. The roller shade of claim 13, wherein the second spring carrier comprises a wheel with an external surface that that rotationally locks with an inner surface of the roller tube.

15. The roller shade of claim 1, wherein the gudgeon body is rotatably connected about the gudgeon pin via at least one ball bearing.

16. The roller shade of claim 15, wherein the first stop or the second stop of the gudgeon pin is retained within the through bore of the gudgeon body by the at least one ball bearing.

17. The roller shade of claim 1, wherein the through bore of the gudgeon body comprises a cross-section having a shape that complements and mates with a shape of the limit nut.

18. The roller shade of claim 17, wherein the limit nut and the cross-section of the through bore comprise the shape selected from the group consisting of a hexagon, a triangle, a square, a heptagon, an octagon, and a star.

19. The roller shade of claim 1, wherein the pretensioned spring comprises a predetermined number of pretension turns $N_p$ determined according to the following formula:

$$N_p = \frac{T_{min\_offset}}{k}$$

where,
$T_{min\_offset}$ is substantially equal to, or offset by a predetermined amount from, a minimum amount of torque required to finish rolling up the shade material, and
k is substantially equal to a torque slope of the roller shade.

20. The roller shade of claim 19, wherein the torque slope k of the roller shade is determined according to the following formula:

$$k = \frac{T_{max} - T_{min}}{N_t}$$

where
$T_{max}$ is substantially equal to a maximum amount of torque required to start rolling up the shade material,
$T_{min}$ is substantially equal to the minimum amount of torque required to finish rolling up the shade material, and
$N_t$ is a number of turns it takes to fully roll up the shade material.

21. The roller shade of claim 20, wherein $T_{max}$ and $T_{min}$ are determined according to the following formulas:

$$T_{max} = r_{rt} \times (w_{sm} + w_{hb}) \quad T_{min} = r_{sm} \times w_{hb}$$

where
$r_{rt}$ is a radius of the roller tube,
$w_{sm}$ is a weight of a shade material,
$w_{hb}$ is a weight of a hem bar, and
$r_{sm}$ is a radius of the shade material when it is fully wrapped around the roller tube.

22. A roller shade comprising:
a roller tube;
a gudgeon pin comprising a first stop and a second stop;
a pretensioned torsion spring comprising a first end and a second end and longitudinally extending therebetween;
a first spring carrier connected to the first end of the spring and to the gudgeon pin;
a second spring carrier connected to the second end of the spring and operably connected to the roller tube;
a gudgeon body rotatably disposed about the gudgeon pin and operably connected to the roller tube, wherein the gudgeon body is at least partially inserted inside the roller tube, wherein the gudgeon body comprises a through bore that retains therein the first stop and the second stop of the gudgeon pin;
a limit nut operably connected to the through bore of the gudgeon body and adapted to axially travel along the gudgeon pin within the through bore and between the first stop and the second stop;

wherein during pretensioning of the torsion spring:

the second spring carrier is adapted to be positioned within the roller tube such that the second spring carrier is operably connected to the roller tube;

the gudgeon body is adapted to be positioned outside the roller tube;

the gudgeon body is adapted to rotate with respect to the roller tube, thereby causing the limit nut to rotate and axially travel in a first direction, until the limit nut comes in contact with the first stop or the second stop;

after the limit nut comes in contact with the first stop or the second stop, the gudgeon body is adapted to further rotate with respect to the roller tube a predetermined number of pretension turns, thereby causing the first spring carrier and the first end of the spring to rotate with respect to the second spring carrier and the second end of the spring; and wherein after the gudgeon body is inserted inside the roller tube the limit nut is adapted to lock the pretension in the pretensioned torsion spring.

23. A roller shade comprising:

a roller tube;

a shade material operably connected to the roller tube and adapted to be rolled onto or from the roller tube between a rolled up position and a rolled down position;

a gudgeon pin comprising a first stop, a second stop, and a longitudinal threaded portion extending therebetween;

a pretensioned torsion spring comprising a first end and a second end and longitudinally extending therebetween;

a first spring carrier connected to the first end of the spring and to the gudgeon pin;

a second spring carrier connected to the second end of the spring and operably connected to the roller tube;

a gudgeon body rotatably disposed about the gudgeon pin and operably connected to the roller tube, wherein the gudgeon body comprises a through bore that retains therein the first stop, the second stop, and the longitudinal threaded portion of the gudgeon pin, wherein the gudgeon pin is configured to travel axially within the through bore and wherein the first stop and the second stop limit the axial travel of the gudgeon pin to stay within the through bore;

a threaded limit nut threadably connected to the threaded portion of the gudgeon pin between the first stop and the second stop, wherein the limit nut is operably connected to the through bore of the gudgeon body, wherein the limit nut abuts the first stop or the second stop when the shade material is in the rolled up position to lock the pretension in the spring.

* * * * *